US008704182B2

(12) United States Patent
Urushiyama et al.

(10) Patent No.: US 8,704,182 B2
(45) Date of Patent: Apr. 22, 2014

(54) THERMOLUMINESCENT LAYERED PRODUCT, THERMOLUMINESCENT PLATE, METHOD OF PRODUCING THERMOLUMINESCENT LAYERED PRODUCT, METHOD OF PRODUCING THERMOLUMINESCENT PLATE AND METHOD OF ACQUIRING THREE-DIMENSIONAL DOSE DISTRIBUTION OF RADIATION

(75) Inventors: Akio Urushiyama, Tokyo (JP);
Kiyomitsu Shinsho, Tokyo (JP); Yuji Tomizawa, Tokyo (JP)

(73) Assignee: Rikkyo Gakuin, Tokyo (JP)

( * ) Notice: Subject to any disclaimer, the term of this patent is extended or adjusted under 35 U.S.C. 154(b) by 287 days.

(21) Appl. No.: 13/132,132

(22) PCT Filed: Nov. 30, 2009

(86) PCT No.: PCT/JP2009/070094
§ 371 (c)(1),
(2), (4) Date: Jun. 17, 2011

(87) PCT Pub. No.: WO2010/064594
PCT Pub. Date: Jun. 10, 2010

(65) Prior Publication Data
US 2011/0253899 A1    Oct. 20, 2011

(30) Foreign Application Priority Data

Dec. 1, 2008   (JP) ................................ 2008-306373
Sep. 4, 2009   (JP) ................................ 2009-204711
Oct. 23, 2009  (JP) ................................ 2009-244317

(51) Int. Cl.
| G01T 1/11 | (2006.01) |
| G01T 1/20 | (2006.01) |
| G01T 1/04 | (2006.01) |
| G01T 1/10 | (2006.01) |
| G01T 1/02 | (2006.01) |
| C09K 11/08 | (2006.01) |

(52) U.S. Cl.
CPC ... *G01T 1/11* (2013.01); *G01T 1/02* (2013.01); *C09K 11/08* (2013.01)

USPC .................... 250/362; 250/473.1; 250/474.1; 250/484.2; 250/484.3

(58) Field of Classification Search
CPC ............. G01T 1/11; G01T 1/02; C09K 11/08
USPC .............. 250/362, 473.1, 474.1, 484.2, 484.3
See application file for complete search history.

(56) References Cited

U.S. PATENT DOCUMENTS 4,506,157 A    3/1985  Keller
(Continued)

FOREIGN PATENT DOCUMENTS

| CN | 101214988 A | * 7/2008 |
| JP | 52-65186 | 5/1977 |

(Continued)

OTHER PUBLICATIONS

International Search Report for PCT/JP2009/070094, mailed Dec. 22, 2009.

(Continued)

*Primary Examiner* — David Porta
*Assistant Examiner* — Abra Fein
(74) *Attorney, Agent, or Firm* — Nixon & Vanderhye P.C.

(Continued)

(57) ABSTRACT

Provided are a dosimeter which uses thermoluminescent plates and with which a three-dimensional dose distribution of radiation can be acquired, a method of producing the dosimeter, and a method of using the dosimeter. A thermoluminescent layered product 11 is constituted of a plurality of thermoluminescent plates 13 which are layered. Each of the thermoluminescent plates 13 is constituted of a thermoluminescent phosphor containing no aluminum (III) and a heat-resistant resin. The thermoluminescent phosphor comprises lithium tetraborate as a base material and manganese as a luminescent center contained in the base material.

21 Claims, 8 Drawing Sheets

(56) References Cited

U.S. PATENT DOCUMENTS

| | | | |
|---|---|---|---|
| 4,510,174 A | | 4/1985 | Holzapfel et al. |
| 4,849,639 A | * | 7/1989 | Born et al. ................. 250/483.1 |
| 5,079,430 A | * | 1/1992 | Yamamoto et al. ........ 250/492.1 |
| 5,731,590 A | * | 3/1998 | Miller ........................ 250/484.5 |
| 6,586,752 B1 | | 7/2003 | Kim et al. |
| 6,815,687 B1 | * | 11/2004 | Branch-Sullivan et al. .. 250/389 |
| 7,141,804 B1 | * | 11/2006 | Akselrod et al. ........... 250/483.1 |
| 2003/0183807 A1 | * | 10/2003 | Shankar et al. ........ 252/301.4 R |
| 2005/0218339 A1 | | 10/2005 | Ishidoya |
| 2008/0185956 A1 | * | 8/2008 | Hiramatsu ................... 313/498 |

FOREIGN PATENT DOCUMENTS

| | | |
|---|---|---|
| JP | 61-269100 | 11/1986 |
| JP | 2002-341034 | 11/2002 |
| JP | 2003-119070 | 4/2003 |
| JP | 2008-256404 | 10/2008 |
| WO | WO 2004/023159 | 3/2004 |

OTHER PUBLICATIONS

The Journal of the Japanese Society of Radiological Technology, vol. 58, No. 6, "Dosimetric Verification in Intensity Modulated Radiation Therapy", Jun. 2002, pp. 761-772 w/English Summary.

The Program of the $56^{th}$ Annual Meeting of the Japan Society of Applied Physics, p. 179, Lecture No. 1a-ZC-9, "Improvement of Thermoluminescence Properties of $Li_2B_4O_7$ Phosphor", Mar. 2009, Yuji Tomizawa, Kiyomitsu Shinsho, Akio Urushiyama w/partial English translation.

* cited by examiner (A)

(B)

Position in irradiated surface of plate-like thermoluminescent product (A)

(D)

(B)

(E)

(C)

THERMOLUMINESCENT LAYERED PRODUCT, THERMOLUMINESCENT PLATE, METHOD OF PRODUCING THERMOLUMINESCENT LAYERED PRODUCT, METHOD OF PRODUCING THERMOLUMINESCENT PLATE AND METHOD OF ACQUIRING THREE-DIMENSIONAL DOSE DISTRIBUTION OF RADIATION

This application is the U.S. national phase of International Application No. PCT/JP2009/070094, filed on 30 Nov. 2009, which designated the U.S. and claims priority to Japan Application No. 2008-306373, filed 1 Dec. 2008; Japan Application No. 2009-204711, filed on 4 Sep. 2009; and Japan Application No. 2009-244317, filed on 23 Oct. 2009, the entire contents of each of which are hereby incorporated by reference.

TECHNICAL FIELD

This invention relates to a thermoluminescent layered product for acquiring the three-dimensional dose distribution of radiation, a thermoluminescent plate, a method of producing the thermoluminescent layered product, a method of producing the thermoluminescent plate, and a method of acquiring the three-dimensional dose distribution of radiation using the thermoluminescent layered product.

BACKGROUND ART

As well known, in recent radiation therapy, advanced stereotactic radiation therapies such as three-dimensional conformal radiation therapy (3D-CRT) and intensity modulated radiation therapy (IMRT) have drawn great attention (see, for example, Non-patent Document 1). In these stereotactic radiation therapies, various parameters are set using, for example, a therapy planning apparatus and thereafter irradiation with radiation is performed using an irradiator apparatus. The parameters to be set include the site and coverage of irradiation, the dose and the like of radiation, e.g., electromagnetic waves such as hard X rays and accelerated particle beams such as electron beams. By stereotactic radiation therapy, precise treatment can be accomplished, e.g., delivering a high dose of radiation only to a lesion while avoiding organs-at-risk neighboring the lesion. Hence, in the stereotactic radiation therapy, it is important to set the above various parameters to appropriate values. Therefore, a high level of mechanical accuracy of an irradiator apparatus and a high level of accuracy in the control of various filters, line width enlargement devices and the like with which the irradiator apparatus is equipped are required.

Thus, in implementation of the above radiation therapies, it is necessary to verify various parameter values which have been set. Particularly, as to the stereoscopic dose distribution of radiation near a lesion which is to be irradiated with the radiation, many empirical data are required. Hence, conventionally, the stereoscopic dose distribution, i.e., three-dimensional dose distribution, of radiation used in therapy is measured with a polymer gel dosimeter (see, for example, Non-patent Document 1).

Meanwhile, to obtain data on the effect of radiation on the human body, it is desirable to measure the exposure dose using a dosimeter having an effective atomic number equivalent to that of living tissues constituting the human body, i.e., tissue equivalent dosimeter. As a dosimeter which is tissue equivalent to the human body, a thermoluminescent plate in the shape of a flat plate is well known (see, for example, Non-patent Document 1).

The thermoluminescent plate contains a thermoluminescent substance, i.e., thermoluminescent phosphor. The thermoluminescent phosphor comprises, for example, lithium tetraborate or the like as a base material and manganese or terbium as a luminescent center contained in the base material. By this structure, the thermoluminescent phosphor has an effective atomic number close to the effective atomic number of the human body. The thermoluminescent plate is constituted of the thermoluminescent phosphor and a heat-resistant resin which serves as a binder.

When irradiated with radiation, the thermoluminescent plate adjusted to be tissue equivalent to the human body produces effects such as photoelectric interaction, Compton effect and electron pair producing effect, and the level of the effects is the same as that in the human body. Thus, when a tissue-equivalent thermoluminescent plate is used as a dosimeter, more accurate data on the dose of radiation with which the human body is exposed can be acquired directly from measured values without making various corrections.

The thermoluminescent plate disclosed in Patent Document 1 is a plate-like product in the shape of a flat plate, as already described. The thermoluminescent plate is irradiated with radiation and then heated to thereby acquire the light intensity distribution of thermofluorescence which occurs in an exposed area of the thermoluminescent plate along a surface irradiated with the radiation. As well known, there is a certain relation between the light intensity of thermofluorescence and the radiation dose. Thus, from the light intensity distribution thus obtained, the planar exposure dose distribution (hereinafter, sometimes referred to simply as "dose distribution"), i.e., two-dimensional dose distribution, of radiation along the surface irradiated with the radiation can be acquired.

CITATION LIST

Patent Documents

Patent Document 1: JP 61-269100 A

Non-Patent Documents

Non-patent Document 1: The Journal of the Japanese Society of Radiological Technology, Vol. 58, No. 6, "Dosimetric Verification in Intensity Modulated Radiation Therapy" June 2002, pp. 761-772

Non-patent Document 2: The Program of the 56th Annual Meeting of the Japan Society of Applied Physics, p. 179, Lecture No. 1a-ZC-9, "Improvement of Thermoluminescence Properties of $Li_2B_4O_7$ Phosphor" March 2009, Yuji Tomizawa, Kiyomitsu Shinsho, Akio Urushiyama

SUMMARY OF INVENTION

Technical Problem

However, the polymer gel dosimeter disclosed in Non-patent Document 1 is an irreversible dosimeter and, thus, only one measurement can be performed with one polymer gel dosimeter. Furthermore, the polymer gel dosimeter has a short quality assurance period, and storage and quality control of the polymer gel dosimeter are difficult.

On the other hand, compared with the polymer gel dosimeter described above, the thermoluminescent plate disclosed in Patent Document 1 is easy to store and control its quality and, furthermore, use of the thermoluminescent plate requires only simple facilities. Further, the thermoluminescent plate is different from the polymer gel dosimeter in that repeat measurements are possible with one thermoluminescent plate. Having these advantages, the thermoluminescent plate is an advantageous dosimeter in terms of cost reduction and general versatility, compared with the polymer gel dosimeter.

However, as described above, the thermoluminescent plate can only measure the two-dimensional dose distribution of radiation on a surface irradiated with the radiation. Thus, the thermoluminescent plate cannot measure the three-dimensional dose distribution of radiation and, therefore, it is not possible to acquire enough data for determining the various parameters of radiation therapy described above.

Solution to Problem

As a result of intensive and extensive studies, the present inventors that the three-dimensional dose distribution of radiation could be acquired by irradiating with radiation a thermoluminescent layered product obtained by producing thermoluminescent plates from a thermoluminescent substance and then layering the thermoluminescent plates three-dimensionally.

Specifically, after irradiated with radiation, the thermoluminescent plates are separated, and each thermoluminescent plate is heated. Then, the light intensity distribution of thermofluorescence which occurs by the heating is measured for each thermoluminescent plate. As described above, there is a certain relation between the light intensity of thermofluorescence and the radiation dose. Thus, from the light intensity distribution measured, a substantial dose distribution can be acquired. Then, the dose distributions acquired from the thermoluminescent plates are rebuilt as the dose distribution of radiation with which the thermoluminescent layered product is irradiated, whereby the stereoscopic dose distribution, i.e., three-dimensional dose distribution, can be acquired.

An object of the present invention is to provide a thermoluminescent layered product for acquiring the three-dimensional dose distribution of radiation which is a dosimeter using a thermoluminescent plate, a thermoluminescent plate suitable for use in the thermoluminescent layered product, methods of producing the thermoluminescent layered product and the thermoluminescent plate as a method of producing the dosimeter, and a method of acquiring the three-dimensional dose distribution of radiation using the dosimeter.

The present invention is defined by each independent claim. Further, each dependent claim constitutes embodiments of the invention.

To accomplish the above object, a method of producing a thermoluminescent plate according to the first subject matter of the present invention includes the following steps.

First, lithium tetraborate, manganese (IV) oxide and aluminum oxide are mixed together to obtain a first mixture.

Then, the first mixture is subjected to thermal treatment to form a first sintered material, and thereafter the first sintered material is ground to obtain a ground material.

Next, the ground material and activated carbon are mixed together to produce a second mixture, and thereafter the second mixture is compression molded into the shape of a flat plate to produce a plate.

Next, the plate is subjected to thermal treatment to produce a thermoluminescent plate as a second sintered material.

A method of producing a thermoluminescent plate according to the second subject matter of the present invention includes the following steps.

First, lithium tetraborate and manganese (IV) oxide are mixed together to produce a first mixture.

Then, the first mixture is subjected to thermal treatment to form a first sintered material, and thereafter this first sintered material is ground to obtain a ground material.

Next, the ground material, a third mixture produced by mixing lithium tetraborate, manganese (IV) oxide and aluminum oxide, and activated carbon are mixed to obtain a second mixture, and thereafter the second mixture is compression molded into the shape of a flat plate to produce a plate.

Next, the plate is subjected to thermal treatment to produce a thermoluminescent plate as a second sintered material.

A method of producing a thermoluminescent layered product according to the third subject matter of the present invention includes the following steps.

First, a plurality of thermoluminescent plates produced using the method of producing a thermoluminescent plate according to the first subject matter are prepared.

Then, the plurality of thermoluminescent plates is layered to produce a thermoluminescent layered product.

A method of acquiring the three-dimensional dose distribution of radiation according to the fourth subject matter of the present invention uses the thermoluminescent layered product produced by the production method according to the third subject matter described above, and comprises the following steps.

First, the thermoluminescent layered product is irradiated with radiation.

Then, an image of thermofluorescence which occurs by heating in each of the plurality of thermoluminescent plates constituting the thermoluminescent layered product is captured from the direction which is perpendicular to layer surfaces of the plurality of thermoluminescent plates, whereby planar light intensity distributions of radiation along the layer surfaces which correspond to the dose distributions of radiation are acquired.

Then, the light intensity distributions thus acquired are superimposed sequentially in the order of layering in the direction of layering, whereby the stereoscopic dose distribution of radiation in the thermoluminescent layered product which corresponds to the stereoscopic light intensity distribution is acquired.

Advantageous Effect of Invention

In the methods of producing a thermoluminescent plate according to the first and second subject matters of the present invention, lithium tetraborate is mixed with aluminum oxide, whereby in the resulting thermoluminescent plate, aluminum (III) is contained in lithium tetraborate serving as a base material. This enables the thermoluminescent plates to emit light with high emission intensity, Thus, the dose distribution of radiation can be acquired with higher sensitivity.

In the methods of producing a thermoluminescent plate according to the first and second subject matters of the present invention, aluminum (III) is added to lithium tetraborate serving as the base material, whereby the mechanical strength of the resulting thermoluminescent plate is increased.

In the method of producing a thermoluminescent layered product according to the third subject matter of the present invention, the thermoluminescent plates produced using the production method according to the first subject matter described above are layered to obtain a thermoluminescent layered product with which the three-dimensional dose distribution of radiation can be acquired.

The thermoluminescent layered product produced by the production method according to the third subject matter is constituted of a plurality of thermoluminescent plates which are layered. As already described, it is well known that there is a certain relation between the light intensity of a thermoluminescent plate and the radiation dose. On the basis of this relation, it is possible to measure the planar dose distribution of radiation along the surface irradiated with radiation (irradiated face), i.e., two-dimensional dose distribution in the surface including the surface irradiated with the radiation, by use of the thermoluminescent plates. Thus, after the thermoluminescent layered product is irradiated with radiation, each thermoluminescent plate constituting the thermoluminescent layered product is heated so that thermofluorescence occurs in each thermoluminescent plate, and the light intensity distribution of the thermofluorescence is measured. From the light intensity distribution, two-dimensional dose distributions of radiation along the surfaces of the thermoluminescent plates which are perpendicular to the layering direction of the thermoluminescent plates, i.e., along the layer surfaces, can be acquired. Then, the two-dimensional dose distributions thus acquired are superimposed sequentially in the order of layering in the layering direction of the thermoluminescent plates, whereby the three-dimensional dose distribution of radiation which corresponds to the thermoluminescent layered product can be acquired.

The thermoluminescent layered product produced by the production method according to the third subject matter of the present invention is produced by layering a plurality of thermoluminescent plates. Thus, the thermoluminescent layered product is a dosimeter which is constituted of thermoluminescent plates and advantageous in terms of cost reduction and general versatility, and can be used as a dosimeter for acquiring the three-dimensional dose distribution of radiation.

As already described, with the thermoluminescent plates produced by the production methods according to the first and second subject matter, the dose distribution can be acquired with high sensitivity to radiation and, furthermore, the thermoluminescent plates have good mechanical strength. Accordingly, with the thermoluminescent layered, the dose distribution can be acquired with high sensitivity to radiation and, furthermore, the thermoluminescent layered has good mechanical strength.

DESCRIPTION OF EMBODIMENTS

Figure 1:
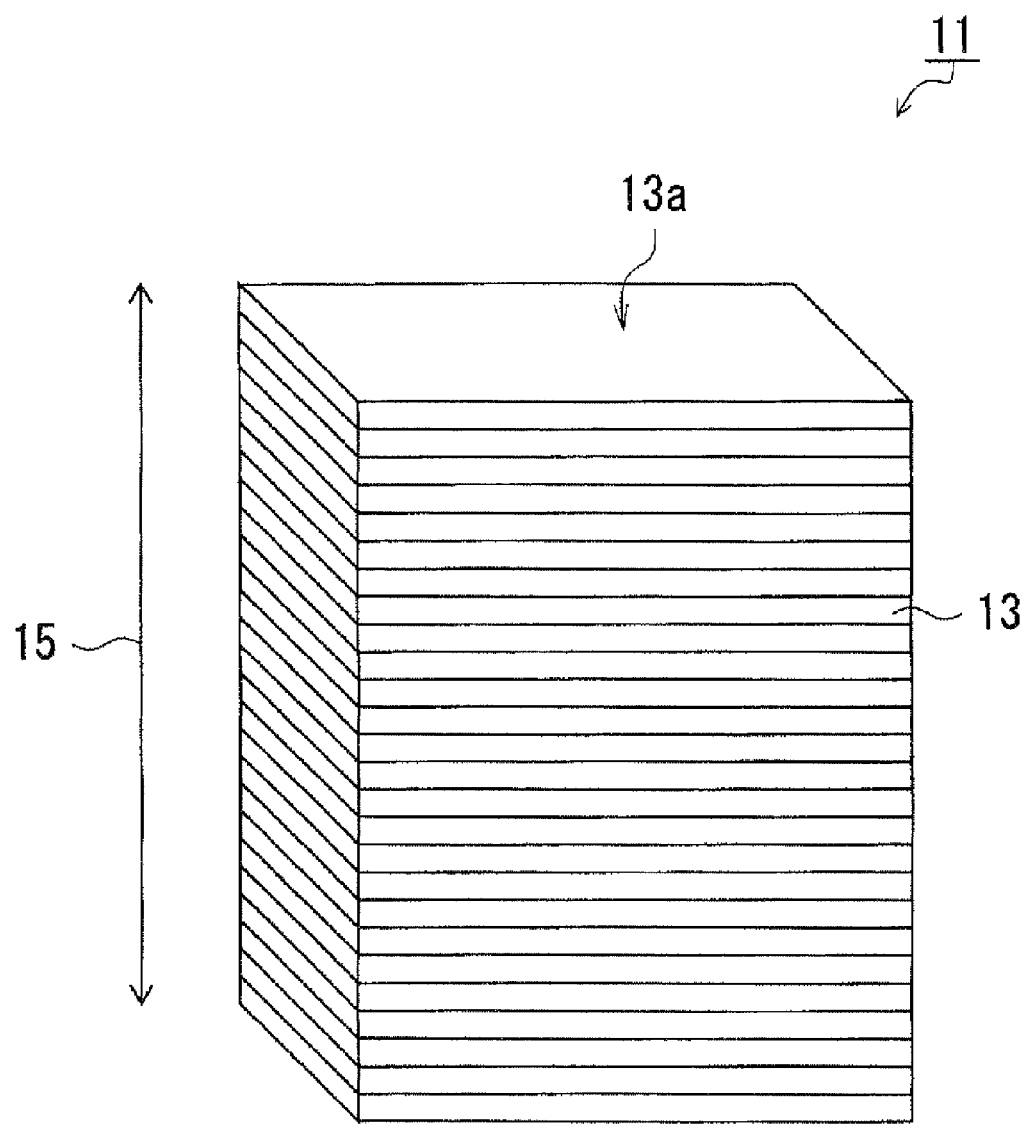
FIG. 1 is presented to explain a thermoluminescent layered product, showing a schematic perspective view of a thermoluminescent layered product according to an embodiment.

Preferred embodiments of the present invention are described below, with reference to the drawings. It should be noted that each figure schematically illustrates the shape, size and positional relation of each constituent element to an extent that the present invention can be understood. Further, embodiments described below are mere preferred embodiments and, thus, the structure of the present invention is not limited in any way to structural examples described below and illustrated in the drawings, and may be altered or modified within the spirit of the present invention.

(Thermoluminescent Layered Product)

A thermoluminescent layered product as a dosimeter using thermoluminescent plates is described below, with reference to FIG. 1. The thermoluminescent layered product according to the present embodiment is a dosimeter with which a three-dimensional dose distribution of radiation can be acquired and which is constituted of a plurality of thermoluminescent plates which are layered.

FIG. 1 illustrates a thermoluminescent layered product according to the present embodiment, showing a schematic perspective view of the thermoluminescent layered product.

As shown in FIG. 1, a thermoluminescent layered product 11 according to the present embodiment is constituted of a plurality of thermoluminescent plates 13 which are layered.

The thermoluminescent layered product 11 according to the present embodiment is used to verify mainly the effect of radiation used in radiation therapy on the human body. As already described, in acquiring data on the effect of radiation on the human body, measurements are conducted using a dosimeter which is tissue equivalent to living tissues constituting the human body, i.e., a dosimeter having an effective atomic number which is of the same level as that of living tissues constituting the human body. The effective atomic number of muscle tissue of the human body is about 7.42 (see, for example, the Japanese Society of Radiological Society ed., "*Kaiteiban Hoshasen Keisokugaku*" (Radiation Metrology, revised edition), Iryokagakusha, p. 136 (File No. 1-2)).

Thus, in the present embodiment, the thermoluminescent layered product 11 is constituted of thermoluminescent plates 13 having an effective atomic number which has been adjusted to a value close to 7.42, i.e., thermoluminescent plates 13 which have been adjusted to be tissue equivalent to the human body. The thermoluminescent plates 13 contain a thermoluminescent phosphor as a thermoluminescent substance. The thermoluminescent phosphor contains lithium tetraborate as a base material and manganese as a luminescent center added to the base material. Since the effective atomic number of lithium tetraborate serving as the base material is about 7.24, the thermoluminescent phosphor in the thermoluminescent plates 13 has an effective atomic number close to 7.42.

Details of the thermoluminescent plates 13 will be described later. When the thermoluminescent plates irradiated with radiation are heated, thermofluorescence occurs in an irradiated area, i.e., exposed area. As already described, the light intensity of this thermofluorescence has a certain relation to the radiation dose in the exposed area. Therefore, by measuring the light intensity distribution of thermofluorescence along a surface of the thermoluminescent plate 13 which has been irradiated, i.e., irradiated face, a two-dimensional dose distribution in the surface including the irradiated face which corresponds to the two-dimensional light intensity distribution can be acquired. Measurement of a two-dimensional light intensity distribution and acquisition of a corresponding two-dimensional dose distribution will be described later.

In the present embodiment, to measure the three-dimensional dose distribution of radiation, the thermoluminescent layered product 11 is formed by layering a plurality of thermoluminescent plates 13. The number of thermoluminescent plates 13 constituting the thermoluminescent layered product 11 and the shape of the planar surface of each thermoluminescent plate 13, which planar surface is perpendicular to the layering direction 15 (i.e., the a layer surface 13a) are appropriately determined according to, for example, the type of radiation and radiant energy to be measured, the area and extent of irradiation, or the purpose of use. FIG. 1 shows a structural example of the thermoluminescent layered product 11 in which 26 thermoluminescent plates 13 are layered and the planar shape of the layer surface 13a of each thermoluminescent plate 13 is rectangular. To acquire a detailed three-dimensional dose distribution from two-dimensional dose distributions acquired from the thermoluminescent plates 13, the thickness of each thermoluminescent plate 13, i.e., the thickness along the layering direction 15 of the thermoluminescent layered product 11, is preferably, for example, 2 mm.

After irradiated with radiation, the thermoluminescent layered product 11 according to the present embodiment is divided into thermoluminescent plates 13, each of which constitutes the thermoluminescent layered product 11. When the thermoluminescent plates 13 thus separated are heated, thermofluorescence occurs. By measuring two-dimensional light intensity distributions of the above thermofluorescence in the respective thermoluminescent plates 13, two-dimensional dose distributions of radiation which correspond to the two-dimensional light intensity distributions can be acquired from the two-dimensional light intensity distributions. The two-dimensional dose distributions thus obtained are two-dimensional dose distributions along the layer surfaces 13a of the thermoluminescent plates 13. The two-dimensional dose distributions thus obtained are superimposed sequentially in the order of layering in the layering direction 15 in which the thermoluminescent plates 11 are layered. This process of layering is to rebuild a three-dimensional dose distribution in the thermoluminescent layered product irradiated with radiation, making it possible to substantially acquire the three-dimensional dose distribution of radiation applied. A specific method of acquiring the three-dimensional dose distribution of radiation using the thermoluminescent layered product 11 will be described in detail later.

The thermoluminescent layered product 11 is constituted of the thermoluminescent plates 13 which are easy to store and control their quality and use of which requires only simple facilities. Hence, the thermoluminescent layered product 11 according to the present embodiment is advantageous in terms of cost reduction and general versatility, compared with the polymer gel dosimeters described above.

A method of producing the thermoluminescent layered product 11 according to the embodiment will be described below, with reference to FIGS. 2(A) and 2(B). This production method includes first and second steps. Each of the steps will be described below, starting with the first step.

Figure 2:
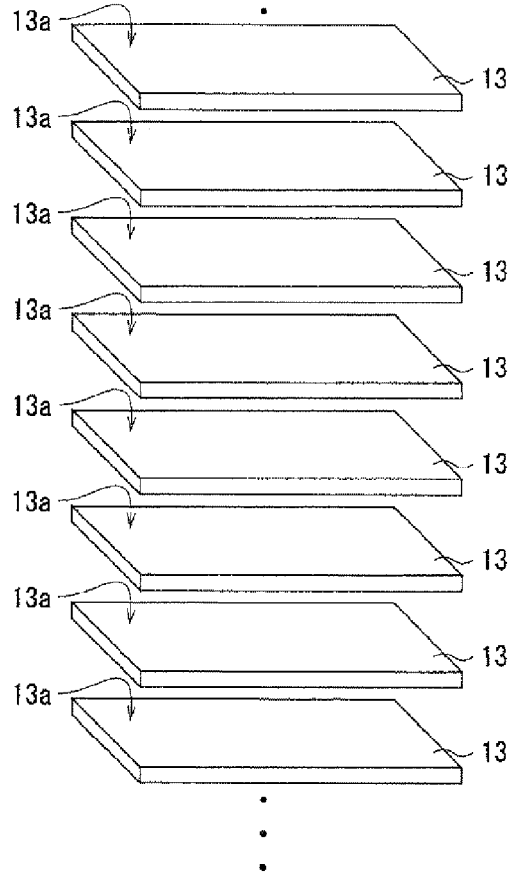
FIGS. 2(A) and 2(B) depict steps of a method of producing the thermoluminescent layered product.
Figure 2:
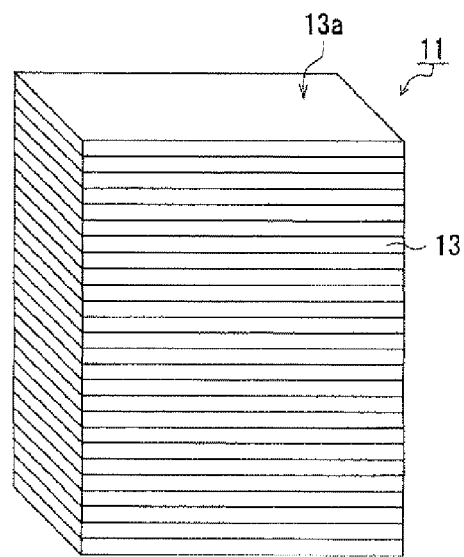

FIGS. 2(A) and 2(B) depict the steps to describe the method of producing the thermoluminescent layered product 11. Each of the figures shows a schematic perspective view of a structure obtained in each stage of production.

In the first step, a plurality of thermoluminescent plates 13 are prepared as shown in FIG. 2(A).

As described above, the effective atomic number of the thermoluminescent phosphor of each thermoluminescent plate 13 is adjusted to a value close to the effective atomic number of the human body. The thermoluminescent plate will be described in detail later. Further, in the present embodiment, the thickness of each thermoluminescent plate 13 is, for example, about 2 mm. The number of thermoluminescent plates 13 to be prepared in the first step and the planar shape of the layer surface 13a are appropriately determined according to, for example, the type and energy of radiation to be measured, the area and extent of irradiation, or the purpose of use. The thermoluminescent plates 13 can be cut by a diamond cutting tool or the like. Thus, the planar shape of the layer surface 13a is appropriately molded in advance according to the radiation to be measured. FIG. 2(A) shows a structural example in which the planar shape of the layer surface 13a of each thermoluminescent plate 13 is rectangular.

Next, in the second step, the plurality of thermoluminescent plates 13 are layered to form the thermoluminescent layered product 11, whereby a structural body as shown in FIG. 2(B) is obtained.

In the present embodiment, the plurality of thermoluminescent plates 13 prepared in the first step are layered sequentially by superimposing the layer surfaces 13a directly without using an adhesive or the like, whereby the thermoluminescent layered product 11 is obtained.

If the density of each thermoluminescent plate 13 prepared is far different from a value close to the human body, e.g., outside the range of $1\pm 0.10$ gcm$^{-3}$, for example, a spacer in the shape of a flat plate may be sandwiched between the thermoluminescent plates 13 in the second step to thereby adjust the density of the entire thermoluminescent layered product 11 to a value within the range of $1\pm 0.10$ gcm$^{-3}$.

(Thermoluminescent Plate)

A preferred embodiment of the thermoluminescent plate will be described below.

The thermoluminescent plate described below is in the shape of a flat plate.

The thermoluminescent plate is constituted of a thermoluminescent phosphor containing lithium tetraborate as a base material and manganese and aluminum (III) which are present in the base material.

Manganese contained in the base material acts as a luminescent center in the thermoluminescent phosphor, i.e., thermoluminescent plate. In the present embodiment, in producing the thermoluminescent plate, manganese (IV) oxide is added to lithium tetraborate to thereby include manganese in the base material. The manganese serving as the luminescent center may be contained in the form of not only an element but also manganese of various oxidation numbers, a compound with other substances contained in the thermoluminescent phosphor, etc.

Aluminum (III) is contained for the purpose of increasing the sensitivity of the thermoluminescent plate. Specifically, in the thermoluminescent plate according to the present embodiment, lithium tetraborate serving as the base material contains aluminum (III) so that when the thermoluminescent plate is heated in a dark box to cause an exposed area to emit light, the exposed area can emit light with higher emission intensity. Thus, with the thermoluminescent plate according to the present embodiment, the dose distribution of radiation can be acquired with higher sensitivity than that of the thermoluminescent plate containing no aluminum (III).

Aluminum (III) has the effect of increasing the mechanical strength of the thermoluminescent phosphor. Thus, in the thermoluminescent plate according to the present embodiment, aluminum (III) is contained in lithium tetraborate serving as the base material so that the thermoluminescent plate is constituted of the thermoluminescent phosphor without using, for example, a binder such as a heat-resistant resin.

In the present embodiment, in producing the thermoluminescent plate, aluminum (III) oxide is added to lithium tetraborate to thereby include aluminum (III) in the base material. Aluminum (III) may be contained in the form of, for example, aluminum (III) oxide, a compound with other substances contained in the thermoluminescent phosphor, etc.

The present inventors conducted an experiment to confirm that the emission intensity was increased by the inclusion of aluminum (III) in the thermoluminescent phosphor. In this experiment, a plurality of samples were prepared by adding different amounts of aluminum oxide to lithium tetraborate serving as the base material, sintering the mixtures to obtain sintered materials and then grinding the sintered materials. Then, each of the samples was irradiated with about 50 Gy of X rays with 8.1 keV of energy and thereafter heated in a dark box at the temperature-increase rate of 0.5° C./sec., and the intensity of emission from each exposed area was measured. To each of the samples, manganese (IV) oxide was added at the ratio of 0.036 wt % with respect to lithium tetraborate so that the manganese (IV) oxide would act as the luminescent center.

Figure 3:
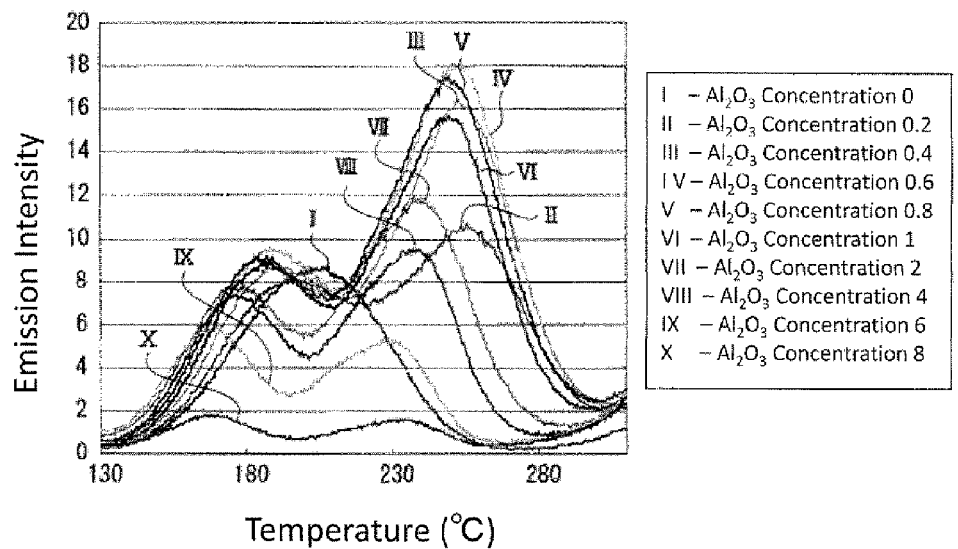
FIG. 3 is presented to confirm the relation between the emission intensity of a thermoluminescent phosphor and the amount of aluminum (III) contained.

FIG. 3 shows the results of this experiment, which is presented to confirm the relation between the emission intensity of the thermoluminescent phosphor and the amount of aluminum (III) contained. In FIG. 3, the relative value of emission intensity is measured along the vertical axis, and the temperature (° C.) is measured along the horizontal axis.

In FIG. 3, curve I shows the results regarding the sample to which no aluminum oxide was added. Curve II shows the results regarding the sample to which aluminum oxide was added at the ratio of 0.2 wt % with respect to lithium tetraborate. Curve III shows the results regarding the sample to which aluminum oxide was added at the ratio of 0.4 wt % with respect to lithium tetraborate. Curve IV shows the results regarding the sample to which aluminum oxide was added at the ratio of 0.6 wt % with respect to lithium tetraborate. Curve V shows the results regarding the sample to which aluminum oxide was added at the ratio of 0.8 wt % with respect to lithium tetraborate. Curve VI shows the results regarding the sample to which aluminum oxide was added at the ratio of 1.0 wt % with respect to lithium tetraborate. Curve VII shows the results regarding the sample to which aluminum oxide was added at the ratio of 2.0 wt % with respect to lithium tetraborate. Curve VIII shows the results regarding the sample to which aluminum oxide was added at the ratio of 4.0 wt % with respect to lithium tetraborate. Curve IX shows the results regarding the sample to which aluminum oxide was added at the ratio of 6.0 wt % with respect to lithium tetraborate. Curve X shows the results regarding the sample to which aluminum oxide was added at the ratio of 8.0 wt % with respect to lithium tetraborate.

As obvious from the results shown in FIG. 3, the sample to which aluminum oxide was added at the ratio of 0.2 wt % (curve II), the sample to which aluminum oxide was added at the ratio of 0.4 wt % (curve III), the sample to which aluminum oxide was added at the ratio of 0.6 wt % (curve IV), the sample to which aluminum oxide was added at the ratio of 0.8 wt % (curve V), the sample to which aluminum oxide was added at the ratio of 1.0 wt % (curve VI), the sample to which aluminum oxide was added at the ratio of 2.0 wt % (curve VII), and the sample to which aluminum oxide was added at the ratio of 4.0 wt % (curve VIII) exhibited a higher peak than that of the sample to which no aluminum oxide was added (curve I). As obvious from the above results, it was confirmed that the inclusion of aluminum (III) in lithium tetraborate serving as the base material in the thermoluminescent plate according to the present embodiment was effective for increasing the emission intensity. Note that in the 56th Annual Meeting of the Japan Society of Applied Physics (Mar. 30 to Apr. 2, 2009, University of Tsukuba, Tsukuba Campus) after the filing of Japanese patent application No. 2008-306373, the inventors of the application gave a presentation on the point that by including aluminum (III) in the thermoluminescent plate, the emission intensity of the thermoluminescent plate could be increased (see, for example, Non-patent Document 2).

Meanwhile, as described above, aluminum (III) added to the base material has the effect of increasing the emission intensity and mechanical strength of the thermoluminescent phosphor, i.e., the thermoluminescent plate according to the present embodiment. The amount of aluminum (III) contained and the effect of increasing the emission intensity and mechanical strength have a dependent relation as follows.

Specifically, as obvious from FIG. 3, the emission intensity of the thermoluminescent phosphor was increased according to the amount of aluminum (III) contained, but excessive addition led to a decrease in the emission intensity. For example, in the above experiment from which the results shown in FIG. 3 were obtained, the peaks of emission intensity of the sample to which aluminum oxide was added at the ratio of 6.0 wt % with respect to lithium tetraborate (curve IX) and the sample to which aluminum oxide was added at the ratio of 8.0 wt % with respect to lithium tetraborate (curve X) were lower than that of the sample to which no aluminum oxide was added (curve I). From this result, it is understood that there exists an optimum aluminum (III) content for increasing the emission intensity of the thermoluminescent phosphor. In the above experiment from which the results shown in FIG. 3 were obtained, the sample (curve IV) to which aluminum oxide was added at the ratio of 0.6 wt % with respect to lithium tetraborate exhibited the highest peak of emission intensity at 250° C. Thus, from the experiment it is considered that in order to increase the emission intensity of the thermoluminescent phosphor containing lithium tetraborate serving as the base material and manganese serving as the luminescent center, it is optimal to add aluminum (III) in the form of aluminum oxide at the ratio of 0.6 wt % with respect to lithium tetraborate.

On the other hand, the mechanical strength of the thermoluminescent phosphor increases simply proportionally to the amount of aluminum (III) contained. Therefore, in order to increase the mechanical strength of the thermoluminescent plate to a higher level, it is necessary to include aluminum (III) in a large amount. However, when the amount of aluminum (III) contained exceeds the above optimum value for emission intensity, it is not possible to efficiently obtain the effect of increasing the emission intensity.

The present inventors found that it was effective to include boron oxide in lithium tetraborate serving as the base material so as not to decrease the emission intensity while adding a greater amount of aluminum (III) to further increase the mechanical strength of the thermoluminescent phosphor, i.e., the thermoluminescent plate according to the present embodiment. Specifically, it was confirmed that by including boron oxide in the base material, the optimum value for increasing the emission intensity described above was increased.

The inventors conducted an experiment to confirm that by including boron oxide in the thermoluminescent phosphor, the emission intensity was increased. In this experiment, a plurality of samples were prepared by adding different amounts of aluminum oxide and boron oxide to lithium tetraborate serving as the base material, sintering the mixtures to form sintered materials and then grinding the sintered materials. Then, each of the samples was irradiated with about 50 Gy of X rays with 8.1 keV of energy and thereafter heated in a dark box at the temperature-increase rate of 0.5° C./sec., and the intensity of emission from each exposed area was measured. To each of the samples, as in the above experiment from which the results shown in FIG. 3 were obtained, manganese (IV) oxide was added at the ratio of 0.036 wt % with respect to lithium tetraborate so that the manganese (IV) oxide would act as a luminescent center.

Figure 4:
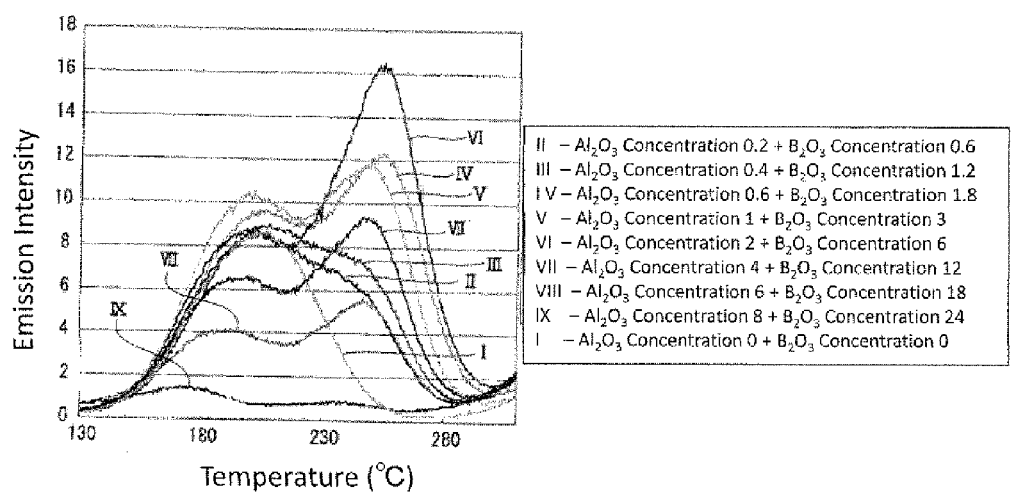
FIG. 4 is presented to confirm the relation between the emission intensity of the thermoluminescent phosphor and the amounts of aluminum (III) and boron oxide contained.

FIG. 4 shows the results of this experiment, which is presented to confirm the relation between the emission intensity of the thermoluminescent phosphor and the amounts of aluminum (III) and boron oxide contained. In FIG. 4, the relative value of emission intensity is measured along the vertical axis, and the temperature (C) is measured along the horizontal axis.

In FIG. 4, curve I shows the results regarding the sample to which no aluminum oxide was added and boron oxide. Curve II shows the results regarding the sample to which aluminum oxide and boron oxide were added at the ratios of 0.2 wt % and 0.6 wt %, respectively, with respect to lithium tetraborate. Curve III shows the results regarding the sample to which aluminum oxide and boron oxide were added at the ratios of 0.4 wt % and 1.2 wt %, respectively, with respect to lithium tetraborate. Curve IV shows the results regarding the sample to which aluminum oxide and boron oxide were added at the ratios of 0.6 wt % and 1.8 wt %, respectively, with respect to lithium tetraborate. Curve V shows the results regarding the sample to which aluminum oxide and boron oxide were added at the ratios of 1.0 wt % and 3.0 wt %, respectively, with respect to lithium tetraborate. Curve VI shows the results regarding the sample to which aluminum oxide and boron oxide were added at the ratios of 2.0 wt % and 6.0 wt %, respectively, with respect to lithium tetraborate. Curve VII shows the results regarding the sample to which aluminum oxide and boron oxide were added at the ratios of 4.0 wt % and 12 wt %, respectively, with respect to lithium tetraborate. Curve VIII shows the results regarding the sample to which aluminum oxide and boron oxide were added at the ratios of 6.0 wt % and 18 wt %, respectively, with respect to lithium tetraborate. Curve IX shows the results regarding the sample to which aluminum oxide and boron oxide were added at the ratios of 8.0 wt % and 24 wt %, respectively, with respect to lithium tetraborate.

In FIG. 4 obtained by this experiment, the sample (curve VI) to which aluminum oxide and boron oxide were added at the ratios of 2.0 wt % and 6.0 wt %, respectively, with respect to lithium tetraborate exhibited the highest peak of emission intensity at 253° C. Thus, in this experiment, it is considered that in the case in which boron oxide is added to the thermoluminescent phosphor, it is optimal to add aluminum (III) in the form of aluminum oxide at the ratio of 2.0 wt % with respect to lithium tetraborate. Meanwhile, in the above-described experiment of FIG. 3 using the sample to which no boron oxide was added, the optimum amount of aluminum oxide to be added to increase the emission intensity was 0.6 wt %. From the results shown in FIGS. 3 and 4, it is confirmed that by including boron oxide in the base material, the optimum amount of aluminum (III) to be added to increase the emission intensity is increased. Hence, it is preferable that the thermoluminescent plate according to the present embodiment contain boron oxide in the base material. Preferred amounts of aluminum (III) and boron oxide to be added will be described in detail later.

In the present embodiment, it is preferable to adjust the effective atomic number of the thermoluminescent phosphor, i.e., the thermoluminescent plate, to a value close to the effective atomic number of the human body. More specifically, considering a method of calculating the effective atomic number and variability in the determinations, the effective atomic number of the thermoluminescent plate according to the present embodiment is preferably adjusted to a value of about 7.3 to 7.5.

Further, in the present embodiment, the density of the thermoluminescent phosphor is adjusted to a value close to the density of muscle tissue of the human body, i.e., 1 gcm$^{-3}$.

As already described, in the present embodiment, the thermoluminescent phosphor contains aluminum (III) so that the thermoluminescent plate is constituted of the thermoluminescent phosphor without using a binder. Therefore, in the present embodiment, the density of the thermoluminescent phosphor is the density of the thermoluminescent plate. Hence, the thermoluminescent plate according to the present embodiment has a density which is even closer that of the human body.

The effective atomic number of the thermoluminescent plate according to the present embodiment described above can be adjusted by adjusting the amounts of raw materials constituting the thermoluminescent plate to be added, i.e., lithium tetraborate serving as the base material, manganese contained in the base material, aluminum (III) and boron oxide, during production. In the present embodiment, activated carbon is added to a thermoluminescent plate precursor at the time of thermal treatment for obtaining the thermoluminescent plate and then the activated carbon is burned off by the thermal treatment during production, whereby the density of the resulting thermoluminescent plate is adjusted to a desired density. The optimum amounts of raw materials to be added and the optimum amount of activated carbon to be added in the thermal treatment described above for adjusting the effective atomic number and density to values close to those of the human body will be described later together with a production method.

With the thermoluminescent plate according to the present embodiment, a planar dose distribution of radiation, i.e., a two-dimensional dose distribution, along a surface irradiated with the radiation can be measured. It is expected that a plurality of thermoluminescent plates according to the present embodiment are layered and used as the thermoluminescent layered product to acquire a three-dimensional dose distribution of radiation. Thus, preferably, the thickness of the thermoluminescent plate according to the present embodiment is adjusted to, for example, about 2 mm so that when a plurality of thermoluminescent plates are layered and irradiated with radiation, a detailed three-dimensional dose distribution of the radiation applied can be acquired. The planar shape of a layer surface of the thermoluminescent plate according to the present embodiment, i.e., the planar shape of the surface perpendicular to the thickness, is appropriately determined according to, for example, the quality, shape or purpose of use of radiation to be measured.

First Embodiment of Method of Producing Thermoluminescent Plate

Next, the first embodiment of the method of producing the thermoluminescent plate will be described below.

First, lithium tetraborate ($Li_2B_4O_7$), manganese (IV) oxide ($MnO_2$), and aluminum oxide ($Al_2O_3$) are mixed together to obtain a first mixture.

As already described, the lithium tetraborate is a base material of a thermoluminescent phosphor in the thermoluminescent plate. Manganese contained in the manganese (IV) oxide acts as a luminescent center of the thermoluminescent plate. Aluminum (III) contained in the aluminum oxide is added for the purposes of increasing the emission intensity and mechanical strength of the thermoluminescent plate and reducing the temperature at which thermal treatment is performed in a subsequent step to form a first sintered material, i.e., firing temperature.

In the first embodiment, to obtain the thermoluminescent plate which has an effective atomic number close to that of the human body and is excellent in mechanical strength and with which a dose distribution can be acquired with high sensitivity, it is preferable to obtain the first mixture by adding manganese (IV) oxide at the ratio of 0.01 to 0.20 wt % and aluminum oxide at the ratio of 0.02 to 2.00 wt % with respect to lithium tetraborate.

The lithium tetraborate, manganese (IV) oxide and aluminum oxide are ground and then mixed together to obtain the first mixture.

Then, the first mixture is subjected to thermal treatment to form a first sintered material. Thereafter, the first sintered material is ground to form a ground material.

In the first embodiment, in the thermal treatment for producing the first sintered material, first, the first mixture obtained by the step described above is moistened with, preferably, a small amount of ethanol to agglomerate the first mixture, and the resulting agglomerate is dried and solidified.

Thereafter, the first mixture is subjected to thermal treatment for 1 to 3 hours using an electric furnace in an air atmosphere at, preferably, 870 to 915° C. Consequently, the first sintered material is obtained from the first mixture.

Then, the ground material of the first sintered material described above, a third mixture obtained by grinding and mixing lithium tetraborate, manganese (IV) oxide and aluminum oxide, and activated carbon are mixed to obtain a second mixture.

Thus, first, lithium tetraborate, manganese (IV) oxide and aluminum oxide are ground and mixed together to obtain the third mixture, separately from the first mixture.

The lithium tetraborate, manganese (IV) oxide and aluminum oxide contained in the third mixture obtained in this step are added for the same purposes as those for which the components of the first mixture described above are added. Specifically, the lithium tetraborate acts as a base material of a thermoluminescent phosphor in the thermoluminescent plate. Manganese contained in the manganese (IV) oxide acts as a luminescent center of the thermoluminescent plate produced. Aluminum (III) contained in the aluminum oxide is added for the purposes of increasing the emission intensity and mechanical strength of the thermoluminescent plate and reducing the temperature at which thermal treatment is performed in a subsequent step to form a second sintered material, i.e., firing temperature.

In the first embodiment, the third mixture described above may be used directly to obtain a second mixture. However, it is more preferable to additionally add boron oxide ($B_2O_3$) at the time of mixing the third mixture. This is because, as already described, the purpose of adding boron oxide is to further increase the optimum amount of aluminum (III) to be added to increase the emission intensity, compared with the case in which no boron oxide is added.

In the first embodiment, in order to accomplish these objects, it is preferable to obtain the third mixture by adding manganese (IV) oxide at the ratio of 0.01 to 0.20 wt %, aluminum oxide at the ratio of 0.02 to 2.00 wt %, and boron oxide at the ratio of up to 8.00 wt % with respect to lithium tetraborate.

The lithium tetraborate, manganese (IV) oxide, aluminum oxide and boron oxide are ground and mixed together to produce the third mixture.

In first embodiment, either of the step of obtaining the third mixture and the step of obtaining the first sintered material described above may be performed first.

As already described, in the first embodiment, activated carbon is added to a thermoluminescent plate precursor, i.e., second mixture, prior to the thermal treatment performed to obtain the thermoluminescent plate, whereby the density of the thermoluminescent plate is adjusted. The mix ratio of raw materials for this adjustment can be determined by repeating experiment. To adjust the density of the resulting thermoluminescent plate to a value close to that of the human body, the ground material of the first sintered material, the third mixture, and activated carbon are mixed at the weight ratio of 1.00:0.10:0.18 in the first embodiment.

At the time of obtaining the third mixture, the ground material of the first sintered material is preferably treated in advance with a mesh sieve to have a uniform particle size. This prevents nonuniformity of the emission intensity of the thermoluminescent plate produced. Then, the first sintered material with a uniform particle size, the third mixture and activated carbon are mixed together to obtain a second mixture.

Thereafter, the resulting second mixture is moistened with a small amount of ethanol or water to agglomerate the second mixture, and the resulting agglomerate is compression molded into the shape of a flat plate to thereby produce a plate.

As already described, a plurality of thermoluminescent plates of the present embodiment are layered and used as the thermoluminescent layered product to acquire a three-dimensional dose distribution of radiation. Further, as described above, in order to make it possible to acquire a detailed three-dimensional dose distribution, the thickness of the thermoluminescent plate is preferably, for example, about 2 mm. Thus, considering the fact that the plate is contracted by thermal treatment performed in a subsequent step, it is preferable to mold the plate to a thickness of, for example, 2.1 mm. It is also preferable to mold the planar shape of the surface of the plate which is perpendicular to the direction of the thickness into, for example, the shape of a circle with a diameter of about 90 mm.

Then, the plate obtained by the above step is subjected to thermal treatment to produce the thermoluminescent plate as the second sintered material.

In the first embodiment, the plate of the second mixture is subjected to thermal treatment for 1 hour using an electric furnace in an air atmosphere at preferably 835° C. Consequently, the thermoluminescent plate as the second sintered material is obtained from the plate. In the case in which the thickness of the plate is 2.1 mm and the planar shape is molded into the shape of a circle with a diameter of about 90 mm, the thermoluminescent plate having a thickness of 2.0 mm and a planar shape which is in the shape of a circle with a diameter of about 86 mm is obtained as the second sintered material.

By this thermal treatment, activated carbon added to the second mixture is burned off to thereby form holes in the thermoluminescent plate, whereby the density of the thermoluminescent plate is adjusted by the holes to a desired density, i.e., density which is close to that of the human body.

By performing the above steps, the thermoluminescent plate is produced. The thermoluminescent plate obtained by the above production method can be cut with, for example, a diamond cutting tool or the like. Thus, the planar shape of the thermoluminescent plate can appropriately be molded according to, for example, the quality, shape or purpose of use of radiation to be measured.

In the method of producing the thermoluminescent plate according to the first embodiment, it is preferable to set the amounts of raw materials to be added as follows.

Specifically, it is preferable that 14.00 g of lithium tetraborate, 0.005 g of manganese (IV) oxide and 0.319 g of aluminum oxide be mixed together to obtain the first mixture and that the first sintered material be formed from the first mixture. Further, it is preferable to mix 1.4000 g of lithium tetraborate, 0.0004 g of manganese (IV) oxide, 0.0250 g of aluminum oxide and 0.0780 g of boron oxide together to obtain the third mixture. Further, it is preferable to mix 14.0 g of the ground material of the first sintered material, 1.40 g of third mixture and 2.52 g of activated carbon together to obtain the second mixture.

The effective atomic number and density of the thermoluminescent plate produced from the raw materials added in the amounts specified above are adjusted to about 7.46 and about 1.06 gcm$^{-3}$, respectively. Specifically, the effective atomic number and density are both within the ranges of desired values which are close to those of the human body, i.e., effective atomic number of 7.3 to 7.5 and density of 1±0.10 gcm$^{-3}$. The effective atomic number $Z_{eff}$ of the thermoluminescent plate obtained can be calculated from the formula (1) below, which is described in, for example, Satoru Fukuda and Masayuki Maekawa, "*Hoshasen Butsurigaku Enshu* (Exercises for Radiation Physics)," Second Edition, pp. 63-64, Toyo Shoten Co., Ltd., 2005.

$$Z_{eff}(a_1Z_1^{2.94}+a_2Z_2^{2.94}+a_3Z_3^{2.94}+\ldots)^{1/2.94}=(\Sigma a_iZ_i^{2.94})^{1/2.94} \quad (1)$$

In this formula (1), $a_1$, $a_2$, $a_3$, ... denote a proportion of electrons which belong to the atomic number $Z_1$, $Z_2$, $Z_3$, ... of each atom contained in the compound or mixture, with respect to the total number of electrons.

The thermoluminescent plate according to the embodiment described above contains aluminum (III) as a result of the addition of aluminum oxide to the base material.

Thus, at the time of acquiring a dose distribution of radiation, i.e., at the time when the thermoluminescent plate according to the present embodiment irradiated with radiation is heated in a dark box to cause an exposed area to emit light, light with high emission intensity is emitted, compared with a well-known, conventional thermoluminescent plate. Therefore, with the thermoluminescent plate according to the present embodiment, a dose distribution of radiation can be acquired with high sensitivity, compared with a well-known, conventional thermoluminescent plate.

In the thermoluminescent plate according to the present embodiment, aluminum (III) is contained in the base material, whereby the mechanical strength is increased.

The present inventors carried out the method of producing the thermoluminescent plate according to the present embodiment described above without adding aluminum oxide to the first and third mixtures described above. It was confirmed that the second sintered material obtained in this case had significantly low mechanical strength and, thus, could not maintain the shape as a flat plate. From this result, it was confirmed that addition of aluminum (III) to the base material was effective for increasing the mechanical strength of the thermoluminescent plate.

The thermoluminescent plate according to the first embodiment contains aluminum (III) to thereby have excellent mechanical strength. Thus, unlike the well-known conventional thermoluminescent plate described above, the thermoluminescent plate according to the first embodiment is constituted of the thermoluminescent phosphor without using a binder. Thus, in the present embodiment, the density of the thermoluminescent plate can easily be adjusted to a desired density in the production method described above by adding activated carbon to the second mixture, which is a thermoluminescent plate precursor, followed by thermal treatment by which the activated carbon is burned off to thereby form holes. In the present embodiment, the thermoluminescent plate is produced to have a density close to that of the human body.

As already described, the effective atomic number of the thermoluminescent plate according to the present embodiment is adjusted to a value close to that of the human body. Thus, when the thermoluminescent plate according to the present embodiment is used as a dosimeter, more accurate data on the dose of radiation with which the human body is exposed can be acquired directly from measured values without making various corrections. Data acquired using the thermoluminescent plate according to the present embodiment can also be used as data on the exposure dose of a substance other than the human body if the substance has an effective atomic number and a density that are close to those of the thermoluminescent plate according to the present embodiment.

Further, the present inventors conducted an experiment in which in the method of producing the thermoluminescent plate according to the present embodiment described above, the raw materials, i.e., lithium tetraborate, manganese (IV) oxide, aluminum oxide and boron oxide, were mixed simultaneously and then subjected to thermal treatment once to produce the thermoluminescent plate without producing the first and third mixtures described above separately. It was confirmed that in this case, the thermoluminescent plate obtained as the sintered material had significantly low mechanical strength and many cracks were formed in the plate, making it impossible to maintain the function as the thermoluminescent plate. The cause thereof is presumed to be due to inadequate adjustment of the amounts of raw materials added. From the above results, it is confirmed that in order to obtain the thermoluminescent plate according to the present embodiment, the method of producing the thermoluminescent plate in which the first sintered material and the third mixture are prepared separately and the second mixture obtained by mixing the first sintered material and the third mixture is subjected to thermal treatment to produce the thermoluminescent plate is effective.

Further, the thermoluminescent plate according to the present embodiment has low hygroscopicity and, thus, can stably be stored in air. It is, therefore, considered that the thermoluminescent plate according to the present embodiment is a dosimeter which is easy to store and control its quality. Unlike the polymer gel dosimeter described above, the thermoluminescent plate according to the present embodiment does not require the use of special equipment in the radiation dose measurement. Further, like a well-known, conventional thermoluminescent plate, the thermoluminescent plate according to the present embodiment can be used repeatedly. In view of the foregoing advantages, it can be considered that the thermoluminescent plate according to the present embodiment is an advantageous dosimeter in terms of cost reduction and general versatility.

Second Embodiment of Method of Producing Thermoluminescent Plate

Next, the second embodiment of the method of producing the thermoluminescent plate will be described below.

In the second embodiment, as in the first embodiment described above, it is preferable to adjust the effective atomic number and density of the thermoluminescent plate to be produced to values close to those of the human body. Thus, in the second embodiment, the specified amounts of raw materials to be added in the steps described below are amounts suitable for adjusting the effective atomic number and density of the thermoluminescent plate to be produced to values within the ranges of desired values close to those of the human body, i.e., effective atomic number of 7.3 to 7.5 and density of $1\pm0.10$ gcm$^{-3}$. These values could be determined by repeating experiment.

The method of producing the thermoluminescent plate according to the second embodiment is different from the method of producing the thermoluminescent plate according to the first embodiment described above in that no aluminum oxide is added to the first mixture, and that the amounts of raw materials added in the respective steps are changed accordingly. Other constituent elements and effects are the same as those in the first embodiment and, thus, explanations thereof are omitted to avoid a repetition.

First, lithium tetraborate and manganese (IV) oxide are mixed together to produce a first mixture.

In this step, it is preferable to obtain the first mixture by adding manganese (IV) oxide at the ratio of about 0.036 wt % with respect to 1 mol of lithium tetraborate. More specifically, it is preferable to add 0.0201 g of manganese (IV) oxide with respect to 55.69 g of lithium tetraborate.

In this step, the lithium tetraborate and manganese (IV) oxide are ground and mixed together to obtain the first mixture.

Then, the first mixture is subjected to thermal treatment to form a first sintered material. Thereafter, the first sintered material is ground to obtain a ground material.

In the production method according to the second embodiment, as in the production method according to the first embodiment described above, in the thermal treatment, first, the first mixture is moistened with a small amount of ethanol or water to agglomerate the first mixture, and the resulting agglomerate is dried and solidified.

Thereafter, the first mixture is subjected to thermal treatment for 1 hour using an electric furnace in an air atmosphere at, preferably, 910° C. Consequently, the first sintered material is obtained from the first mixture.

Then, the ground material of the first sintered material described above, a third mixture obtained by grinding and mixing lithium tetraborate, manganese (IV) oxide and aluminum oxide together, and activated carbon is mixed to obtain a second mixture.

Thus, first, lithium tetraborate, manganese (IV) oxide and aluminum oxide are ground and mixed together to obtain the third mixture.

In the second embodiment, it is preferable to add 0.0004 g of manganese (IV) oxide and 0.025 g of aluminum oxide with respect to 1.096 g of lithium tetraborate.

In the second embodiment, it is preferable to add boron oxide to the third mixture. As already described, boron oxide is added for the purpose of increasing the optimum amount of aluminum (III) to be added to increase the emission intensity. Hence, in the second embodiment, it is preferable to add 0.078 g of boron oxide to the third mixture.

The lithium tetraborate, manganese (IV) oxide, aluminum oxide and boron oxide are ground and mixed together to obtain the third mixture.

In the second embodiment, either of the step of obtaining the third mixture and the step of obtaining the first sintered material may be performed first.

In the second embodiment, as in the production method according to the first embodiment described above, activated carbon is added to a thermoluminescent plate precursor, i.e., second mixture, prior to the thermal treatment for obtaining the thermoluminescent plate, i.e., prior to a subsequent thermal treatment, to thereby adjust the density of the thermoluminescent plate produced. To adjust the density of the thermoluminescent plate produced to a value close to that of the human body, 12.0 g of the ground material of the first sintered material, all the third mixture, and 2.16 g of activated carbon are added.

In this step, as in the production method according to the first embodiment described above, at the time of obtaining the second mixture, the ground material of the first sintered material is preferably treated in advance with a mesh sieve to have a uniform particle size. This prevents nonuniformity of the emission intensity of the thermoluminescent plate produced. Then, the ground material of the first sintered material with a uniform particle size is mixed with the third mixture and activated carbon to obtain the second mixture.

Thereafter, the resulting second mixture is moistened with a small amount of ethanol or water to agglomerate the second mixture, and the resulting agglomerate is compression molded into the shape of a flat plate to thereby produce a plate.

As already described, a plurality of thermoluminescent plates are layered and used as the thermoluminescent layered product to acquire a three-dimensional dose distribution of radiation. Thus, in the second embodiment, as in the production method according to the first embodiment described above, the thickness of the thermoluminescent plate is preferably, for example, about 2 mm. Thus, considering the fact that the plate is contracted by thermal treatment, it is preferable to mold the plate to a thickness of, for example, 2.1 mm. It is also preferable to mold the planar shape of the surface of the plate which is perpendicular to the direction of the thickness into, for example, the shape of a circle with a diameter of about 90 mm.

Then, the plate is subjected to thermal treatment to produce a thermoluminescent plate as a second sintered material.

In the second embodiment, as in the production method according to the first embodiment described above, the second mixture is subjected to thermal treatment for 1 hour using an electric furnace in an air atmosphere at, preferably, 875° C. Consequently, the thermoluminescent plate as the second sintered material is obtained from the plate. In the case in which the thickness of the plate is 2.1 mm and the planar shape is molded into the shape of a circle with a diameter of about 90 mm, the thermoluminescent plate having a thickness of 2.0 mm and a planar shape which is in the shape of a circle with a diameter of about 86 mm is obtained as the second sintered material.

Further, by the thermal treatment in this step, activated carbon added to the second mixture is burned off to thereby form holes in the thermoluminescent plate. Consequently, the density of the thermoluminescent plate is adjusted by the holes to a desired density, i.e., density close to that of the human body.

In the second embodiment, by performing the above steps, the thermoluminescent plate with an effective atomic number adjusted to about 7.3 to 7.5 and a density adjusted to 1±0.10 gcm$^{-3}$, i.e., the thermoluminescent plate with an effective atomic number and a density which are close to those of the human body, can be obtained.

Third Embodiment of Method of Producing Thermoluminescent Plate

Next, the third embodiment of the method of producing a thermoluminescent plate will be described below.

Meanwhile, the present inventors found that by adjusting the amounts of raw materials added which constitute the thermoluminescent plate, the aluminum (III)-containing thermoluminescent plate described above could be produced even when the plate is produced without adding any additional third mixture of lithium tetraborate, manganese (IV) oxide and aluminum oxide to the ground material, i.e., without preparing the third mixture described above. Thus, as the third embodiment of the method of producing the thermoluminescent plate, a production method in which no third mixture is mixed will be described below.

First, lithium tetraborate ($Li_2B_4O_7$), manganese (IV) oxide ($MnO_2$) and aluminum oxide ($Al_2O_3$) are mixed together to produce a first mixture.

The lithium tetraborate is a base material of a thermoluminescent phosphor in the resulting thermoluminescent plate. Manganese contained in the manganese (IV) oxide acts as a luminescent center of the thermoluminescent plate produced. Aluminum (III) contained in the aluminum oxide is added for the purpose of increasing the emission intensity and mechanical strength of the thermoluminescent plate produced and reducing the temperature at which thermal treatment is performed in the subsequent step to obtain a first sintered material, i.e., firing temperature.

In the third embodiment, in order to obtain the thermoluminescent plate which has an effective atomic number close to that of the human body and is excellent in mechanical strength and with which a dose distribution can be acquired with high sensitivity, it is preferable to obtain the first mixture by adding manganese (IV) oxide at the ratio of 0.03 to 0.16 wt %, more preferably 0.037 wt %, and aluminum oxide at the ratio of 0.6 to 3.6 wt %, more preferably 0.72 wt %, with respect to 1 mol of lithium tetraborate.

The lithium tetraborate, manganese (IV) oxide and aluminum oxide are ground and mixed together to obtain the first mixture.

Then, the first mixture is subjected to thermal treatment to obtain a first sintered material. Thereafter, the first sintered material is ground to obtain a ground material.

In the third embodiment, in the thermal treatment, first, the first mixture is moistened with a small amount of ethanol to agglomerate the first mixture, and the resulting agglomerate is dried and solidified.

Thereafter, the first mixture is subjected to thermal treatment for 1 hour using an electric furnace in an air atmosphere at, preferably, 870 to 915° C., more preferably 890° C. Consequently, the first sintered material is obtained from the first mixture. Then, the first sintered material is ground to form a ground material from the first sintered material.

Next, the ground material is compression molded into the shape of a flat plate to produce a plate.

In the third embodiment, in order to produce the thermoluminescent plate as a dosimeter having physical properties similar to those of living tissues constituting the human body, not only the effective atomic number but also the density of the thermoluminescent plate described above are adjusted to values close to those of the human body. More specifically, in the first embodiment, it is preferable to adjust the density of the thermoluminescent phosphor to a value close to the density of muscle tissue of the human body, i.e., 1 gcm$^{-3}$.

Hence, to adjust the density, it is preferable to obtain the second mixture by mixing the ground material with activated carbon prior to the compression molding. Preferably, the second mixture is compression molded into the shape of a flat plate to produce a plate.

By producing the second mixture and producing the plate from the second mixture as described above, activated carbon is burned off from the plate in the thermal treatment performed in a subsequent step. Consequently, holes are formed in areas of the resulting thermoluminescent plate where the activated carbon was burned off. Accordingly, by adjusting the proportion of the holes in the thermoluminescent plate, the density of the thermoluminescent plate can be adjusted to a desired density, i.e., density close to that of the human body.

In the third embodiment, to obtain the thermoluminescent product with a density close to that of the human body, it is preferable to obtain the second mixture by mixing activated carbon at the weight ratio that is up to 0.19-fold the ground material. More preferably, the ground material and activated carbon are mixed at the weight ratio of 1:0.16 to obtain the second mixture.

At the time of obtaining the second mixture, the ground material of the first sintered material is preferably treated in advance with a mesh sieve to have a uniform particle size. This prevents nonuniformity of the emission intensity of the thermoluminescent plate produced. Then, the ground material with a uniform particle size is mixed with activated carbon to obtain the second mixture.

Further, preferably, the second mixture is moistened with a small amount of ethanol or water to agglomerate the second mixture, and the agglomerated second mixture is compression molded into the shape of a flat plate to produce a plate.

A plurality of thermoluminescent plates of the third embodiment are layered and used as the thermoluminescent layered product to acquire a three-dimensional dose distribution of radiation. In order to make it possible to acquire a detailed three-dimensional dose distribution, for example, the thickness of the thermoluminescent plate is preferably, for example, about 2 mm. Thus, considering the fact that the plate is contracted by thermal treatment performed in a subsequent step, it is preferable to mold the plate to a thickness of, for example, 2.1 mm. It is also preferable to mold the planar shape of the surface of the plate which is perpendicular to the direction of the thickness into, for example, the shape of a circle with a diameter of about 90 mm.

Further, as another example, the thermoluminescent plate ultimately obtained preferably has a thickness of, for example, about 4.0 mm, and the planar shape of the surface which is perpendicular to the direction of the thickness is preferably, for example, a square with each side having a length of about 84 mm. Thus, considering the fact that the plate is contracted by thermal treatment performed in a subsequent step, it is preferable to mold the plate to a thickness of, for example, 5.0 mm. It is also preferable to mold the planar shape of the surface of the plate which is perpendicular to the direction of the thickness into, for example, the shape of a square with each side having a length of about 86 mm.

In the method of producing a thermoluminescent plate according to the third embodiment, the first mixture is produced by mixing lithium tetraborate, manganese (IV) oxide and aluminum oxide in the amounts specified above. Thus, unlike the production method according to the first embodiment, it is unnecessary to add another mixture of lithium tetraborate, manganese (IV) oxide and aluminum oxide which are the same components as those of the first mixture, i.e., it is not necessary to add the mixture again, to the ground material at the time of producing the plate in the third step.

Then, the plate is subjected to thermal treatment to produce a thermoluminescent plate as a second sintered material.

In this step, the plate is subjected to thermal treatment for 1 hour using an electric furnace in an air atmosphere at, preferably, 870 to 875° C. Consequently, a thermoluminescent plate as the second sintered material is produced from the plate. By carrying out the thermal treatment at a temperature within the above range, the thermoluminescent plate with excellent hardness and workability can be obtained.

In the case in which the thickness of the plate is 2.1 mm and the planar shape is molded into the shape of a circle with a diameter of about 90 mm, the thermoluminescent plate having a thickness of 2.0 mm and a planar shape with a diameter of about 86 mm is obtained as the second sintered material.

In the case in which the thickness of the plate is 5.0 mm and the planar shape is molded into the shape of a square with each side having a length of about 86 mm, the thermoluminescent plate having a thickness of 4.0 mm and a planar shape which is in the shape of a square with each side having a length of about 84 mm is obtained as the second sintered material.

The thermoluminescent plate obtained by the above production method can be cut with, for example, a diamond cutting tool or the like. Thus, the planar shape of the thermoluminescent plate can appropriately be determined according to, for example, the type and energy of radiation to be measured, the area and extent of irradiation, or the purpose of use.

In the case in which activated carbon is added to the ground material, the activated carbon is burned off as a result of the thermal treatment performed in this step to thereby form holes in the thermoluminescent plate, whereby the density of the thermoluminescent plate is adjusted by the holes to a desired density, i.e., density close to that of the human body.

The thermoluminescent plate obtained in the third embodiment is in the shape of a flat plate and constituted of a thermoluminescent phosphor comprising lithium tetraborate as a base material and manganese and aluminum (III) present in the base material.

As already described, manganese contained in the base material acts as a luminescent center in the thermoluminescent phosphor, i.e., thermoluminescent plate. In the third embodiment, as described above, manganese (IV) oxide is added to lithium tetraborate to thereby include manganese in the base material. Thus, in the third embodiment, manganese serving as the luminescent center may be contained in the form of not only an element but also manganese of various oxidation numbers, a compound with other substances contained in the thermoluminescent phosphor, etc.

Further, as already described, aluminum (III) is contained for the purpose of increasing the sensitivity of the thermoluminescent phosphor, i.e., thermoluminescent plate. Specifically, in the thermoluminescent plate, aluminum (III) is contained in lithium tetraborate serving as the base material so that at the time of acquiring a dose distribution from the thermoluminescent plate irradiated with radiation, i.e., for example, at the time when the thermoluminescent plate is preferably heated in a dark box to cause an exposed area to emit light, the exposed area can emit light with high emission intensity. Thus, with the thermoluminescent plate according to the third embodiment, the dose distribution of radiation can be acquired with high sensitivity, compared with the thermoluminescent plate containing no aluminum (III).

Further, aluminum (III) has the effect of increasing the mechanical strength of the thermoluminescent phosphor, i.e., thermoluminescent plate. Thus, in the thermoluminescent plate, aluminum (III) is contained in lithium tetraborate serving as the base material so that the thermoluminescent plate is constituted of the thermoluminescent phosphor without using, for example a binder such as a heat-resistant resin.

In the third embodiment, as described above, aluminum (III) oxide is added to lithium tetraborate to thereby include aluminum (III) in the base material. Thus, in the third embodiment, aluminum (III) may be contained in the form of, for example, aluminum (III) oxide, a compound with other substances contained in the thermoluminescent phosphor, etc.

As already described, the effective atomic number of the thermoluminescent plate obtained by the third embodiment is adjusted to a value close to the effective atomic number of the human body (within the range of 7.3 to 7.5).

In the third embodiment, the density of the plate-shaped thermoluminescent product is adjusted to a value close to the density of muscle tissue of the human body, i.e., 1 gcm$^{-3}$ (value within the range of 0.9 to 1.1 gcm$^{-3}$).

Hence, when the thermoluminescent plate obtained by the production method according to the third embodiment is used as a dosimeter, more accurate data on the dose of radiation with which the human body is exposed can be acquired directly from measured values without making various corrections. The data acquired using the thermoluminescent plate according to the third embodiment can also be used as data on the exposure dose of a substance other than the human body if the substance has an effective atomic number and a density which are close to those of the thermoluminescent plate.

In the method of producing the thermoluminescent plate according to the third embodiment, it is preferable to set the amounts of raw materials to be added as follows.

Specifically, it is preferable that lithium tetraborate, manganese (IV) oxide and aluminum oxide be mixed at the weight ratio of 1:0.00036:0.0072 to obtain a first mixture, and a first sintered material be obtained from the first mixture. Then, a ground material of the first sintered material obtained with the above weight ratio is preferably mixed with activated carbon at the weight ratio of 1:0.16 to produce the second mixture.

The effective atomic number and density of the thermoluminescent plate produced from the raw materials added in the amounts specified above are adjusted to about 7.46 and about 1 gcm$^{-3}$, respectively; the thermoluminescent plate having an effective atomic number and a density within the ranges of desired values which are close to those of the human body, i.e., effective atomic number of 7.3 to 7.5 and density of 1±0.10 gcm$^{-3}$, can be obtained.

The present inventors conducted an experiment to confirm that the thermoluminescent plate obtained by the third embodiment could function as a dosimeter. This experiment will be described below, with reference to FIGS. 5 to 7.

In this experiment, the thermoluminescent plate 13 obtained by the production method according to the third embodiment was irradiated with X rays such that various areas of a surface 13a of the thermoluminescent plate 13 as an irradiated face which was perpendicular to the direction of the thickness of the thermoluminescent plate 13 were irradiated with different doses of X rays. The emission intensity from each exposed area was measured.

Figure 5:
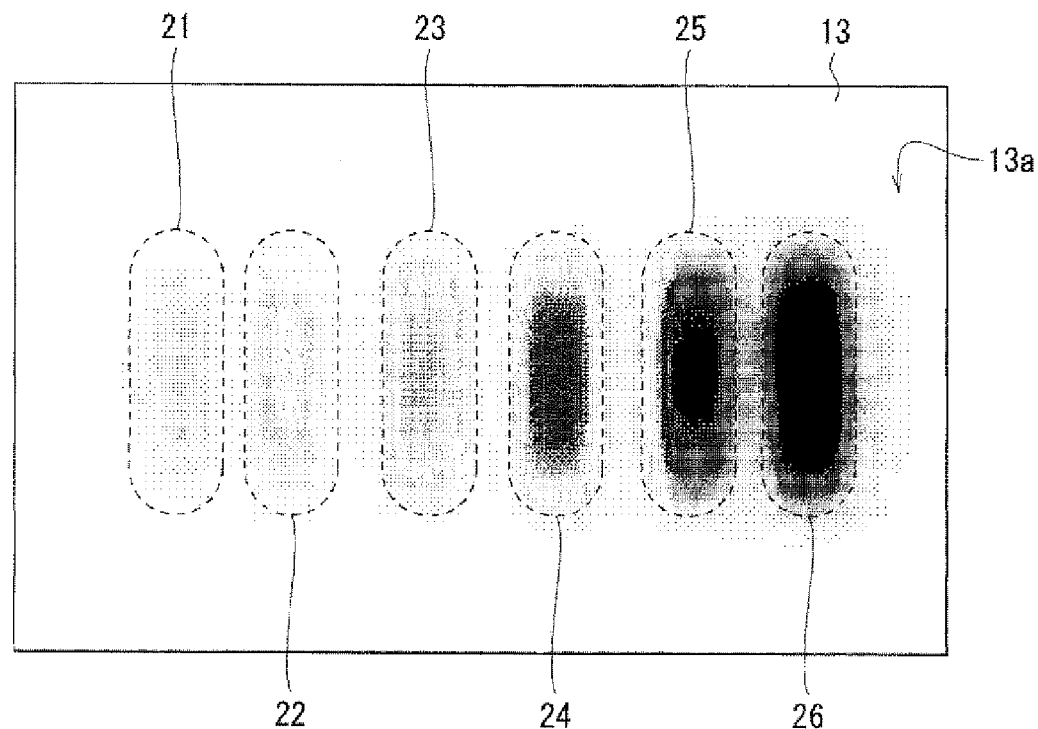
FIG. 5 shows an image of light emitted at the time of thermofluorescence in a thermoluminescent plate produced by a production method according to the third embodiment.

FIG. 5 shows an image of the thermoluminescent plate 13 captured with a CCD camera, showing how light was emitted at the time of thermofluorescence of the thermoluminescent plate 13.

As already described, various areas of the thermoluminescent plate 13 shown in FIG. 5 were irradiated with X rays at different doses; more specifically 1 Gy, 2 Gy, 4 Gy, 8 Gy, 16 Gy, and 32 Gy of X rays with 9 keV of energy. After irradiation with the X rays, each sample was placed and heated on a metal plate heated at 390° C. in a dark box, and an image of light emitted from each exposed area was captured. FIG. 5 shows the image of the thermoluminescent plate 13 in grayscale; a color closer to black indicates an area which emits stronger light.

Among the X-ray exposed areas given the reference numerals 21 to 26 in FIG. 5, the exposed area 21 is an area irradiated with 1 Gy of X rays; the exposed area 22 is an area irradiated with 2 Gy of X rays; the exposed area 23 is an area irradiated with 4 Gy of X rays; the exposed area 24 is an area irradiated with 8 Gy of X rays; the exposed area 25 is an area irradiated with 16 Gy of X rays; and the exposed area 26 is an area irradiated with 32 Gy of X rays.

Figure 6:
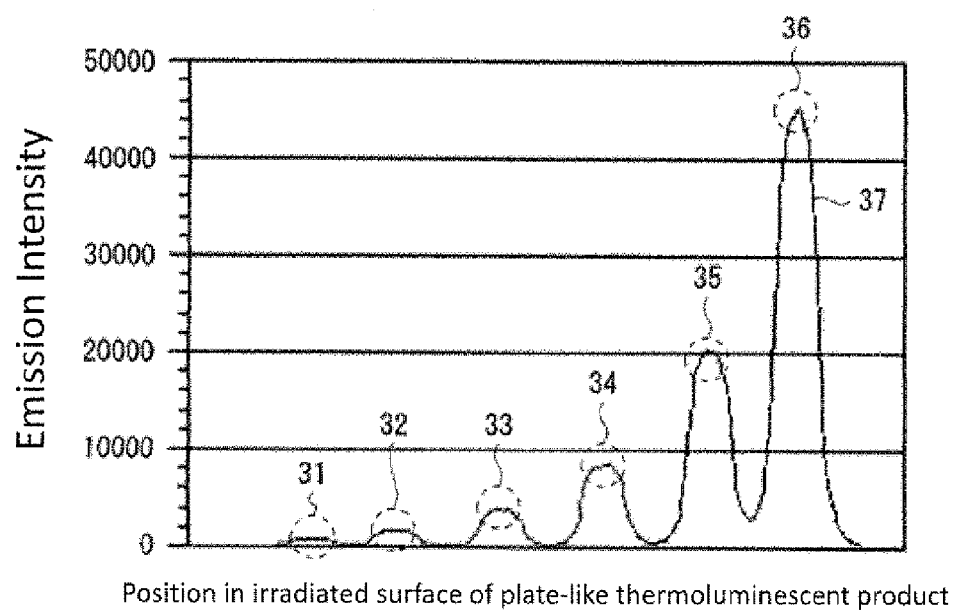
FIG. 6 shows the emission intensity of an exposed area of the thermoluminescent plate produced by the production method according to the third embodiment.

FIG. 6 shows the emission intensity of the exposed areas 21 to 26 of the thermoluminescent plate 13 used in the experiment. A curve 37 of the emission intensity shown in FIG. 6 corresponds to light emitted in the exposed areas 21 to 26 of the thermoluminescent plate 13 shown in FIG. 5. In FIG. 6, the relative value of emission intensity is measured along the vertical axis, and the position coordinate on the irradiated face of the thermoluminescent plate 13 shown in FIG. 5 is measured along the horizontal axis.

Among the peaks 31 to 36 of emission intensity confirmed in the curve 37, the peak 31 indicates the emission intensity (794) in the exposed area 21; the peak 32 indicates the emission intensity (1684) in the exposed area 22; the peak 33 indicates the emission intensity (3833) in the exposed area 23; the peak 34 indicates the emission intensity (8479) in the exposed area 24; the peak 35 indicates the emission intensity (20228) in the exposed area 25; and the peak 36 indicates the emission intensity (44711) in the exposed area 26.

Figure 7:
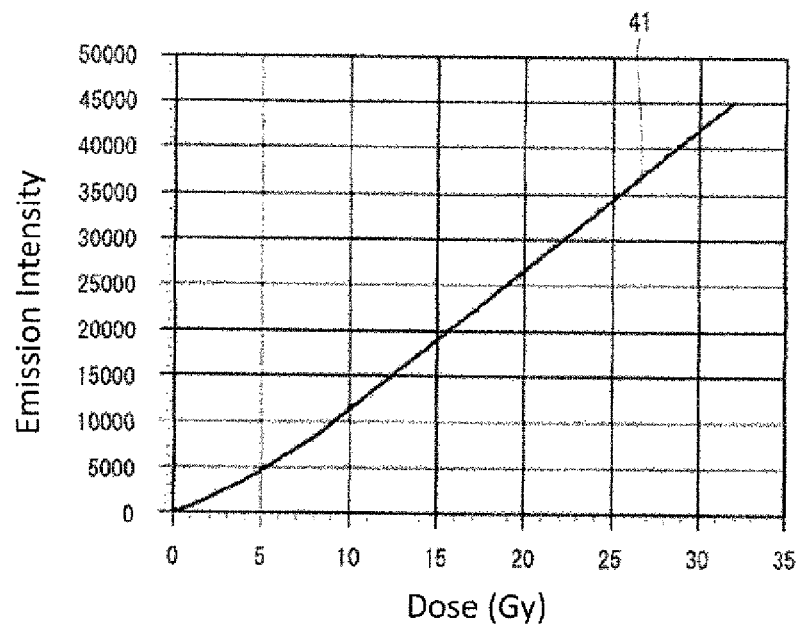
FIG. 7 shows the relation between the emission intensity and the dose of the thermoluminescent plate produced by the production method according to the third embodiment.

FIG. 7 depicts the relation between the emission intensity and the dose in the thermoluminescent plate 13 used in the experiment. In FIG. 7, the relative value of emission intensity is measured along the vertical axis, and the dose (Gy) is measured along the horizontal axis. Curve 41 in FIG. 7, which shows the relation between the emission intensity and the dose, is determined on the basis of peaks 31 to 36 shown in FIG. 6. Specifically, emission intensities of the peaks 31 to 36 confirmed in FIG. 6 and doses of X rays with which the exposed areas 21 to 26 corresponding to the peaks 31 to 36 were irradiated were plotted, and the curve 41 was determined approximately on the basis of points thus plotted.

As clearly shown by the results shown in FIGS. 5 to 7, with the thermoluminescent plate 13 obtained by the production method according to the third embodiment, emission of light can be confirmed even in the case of X rays at the dose of 1 Gy and, furthermore, it is possible to determine the curve 41 as shown in FIG. 7 which depicts the relation between the emission intensity and the X-ray radiation dose. Thus, by reference to the curve 41 as a calibration curve, the dose of X rays with which an exposed area of the thermoluminescent plate 13 was irradiated can be determined as a substantially-acceptable value, or a practically-acceptable value, from the emission intensity of the exposed area. Accordingly, it is confirmed that the thermoluminescent plate 13 obtained by the production method according to the third embodiment is capable of functioning as a dosimeter.

Thus, with the thermoluminescent plate 13 according to the third embodiment, the planar dose distribution of radiation, i.e., two-dimensional dose distribution, along a surface irradiated with the radiation can be measured.

Further, the present inventors conducted an experiment to confirm that the thermoluminescent plate obtained by the third embodiment had an emission intensity which was higher than or equal to that of the thermoluminescent plate produced by the production method according to the first embodiment described above.

In the experiment, a sample of the thermoluminescent plate obtained by the production method according to the third embodiment and a sample of the thermoluminescent plate produced by the production method according to the first embodiment were prepared. Each of the samples was irradiated with 10 Gy of X rays with 9 keV of energy and then placed and heated on a metal plate heated at 400° C. in a dark box. The intensity of emission from each exposed area was measured.

Figure 8:
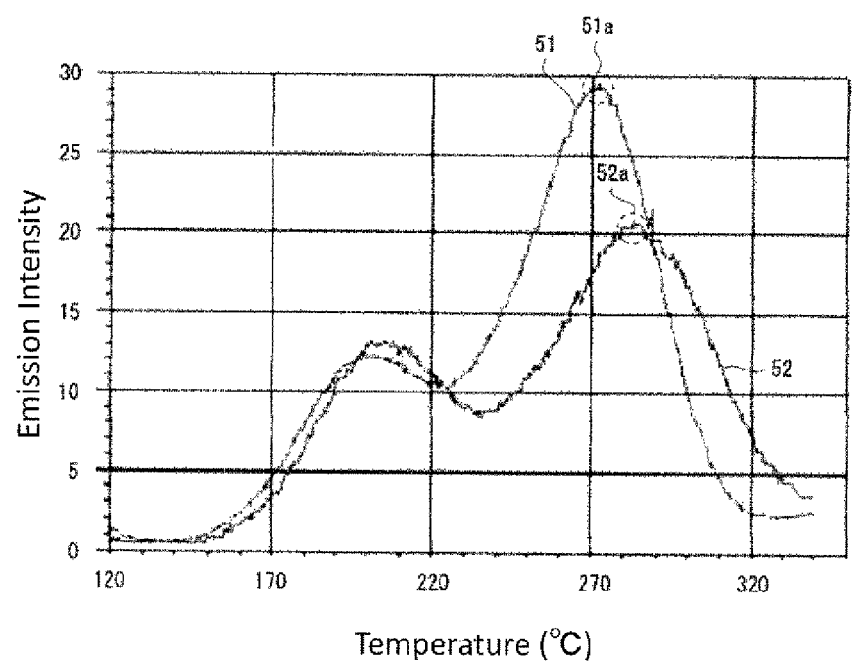
FIG. 8 is presented to compare the emission intensity of the thermoluminescent plate produced by the production method according to the third embodiment with the emission intensity of the thermoluminescent plate produced by the production method according to the first embodiment.

FIG. 8 shows the results of the experiment for a comparison of the emission intensity of the thermoluminescent plate obtained by the third embodiment with the emission intensity of the thermoluminescent plate obtained by the first embodiment. In FIG. 8, the relative value of emission intensity is measured along the vertical axis, and the temperature (° C.) is measured along the horizontal axis.

In FIG. 8, curve 51 shows the results regarding the thermoluminescent plate obtained by the third embodiment. As the sample related to the curve 51, a thermoluminescent plate produced under the following conditions was used. Specifically, in the third embodiment described above, 555.0 g of lithium tetraborate, 0.206 g of manganese (IV) oxide and 4.110 g of aluminum oxide were mixed together to obtain the first mixture. Further, 20 g of ground material of the first mixture and 3.6 g of activated carbon were mixed together to obtain the second mixture.

In FIG. 5, curve 52 shows the results regarding the thermoluminescent plate obtained by the production method according to the first embodiment described above. As the sample related to the curve 52, a thermoluminescent plate produced under the following conditions was used. Specifically, in the production method according to the first embodiment described above, manganese (IV) oxide and aluminum oxide were mixed at the ratios of 0.036 wt % and 0.4 wt %, respectively, with respect to lithium tetraborate to obtain the first mixture. Further, manganese (IV) oxide, aluminum oxide and boron oxide were mixed at the ratios of 0.036 wt %, 2.0 wt % and 6.0 wt %, respectively, with respect to lithium tetraborate to obtain the third mixture. Further, 18 wt % of activated carbon was added to a mixture obtained by mixing the first and third mixtures at the weight ratio of 9:1, whereby the second mixture was obtained.

The reason why boron oxide was added to the thermoluminescent plate of the first embodiment related to the curve 52 will be described below.

The emission intensity of the thermoluminescent phosphor increases in response to the amount of aluminum (III) contained, but when an excessive amount is added, the emission intensity decreases. In other words, there exists an aluminum (III) content for increasing the emission intensity of the thermoluminescent phosphor.

On the other hand, the mechanical strength of thermoluminescent phosphor increases simply proportionally to the amount of aluminum (III) contained.

Thus, if aluminum (III) is included in a large amount to further increase the mechanical strength of the thermoluminescent plate and consequently exceeds the optimum value described above, the effect of increasing the emission intensity cannot be obtained efficiently.

The present inventors found that it was effective to include boron oxide in lithium tetraborate serving as the base material in order not to lower the emission intensity while adding aluminum (III) in a larger amount to further increase the mechanical strength of the thermoluminescent plate. In other words, they confirmed that by including boron oxide in the base material, the optimum value for increasing the emission intensity described above was increased.

Hence, boron oxide is contained in the thermoluminescent plate of the first embodiment of the curve 52 in order to obtain excellent emission intensity while further increasing the mechanical strength.

In the results shown in FIG. 8, the thermoluminescent plate obtained by the production method according to the third embodiment has a peak 51a of emission intensity at around 270° C. The thermoluminescent plate of the first embodiment has a peak 52a of emission intensity at around 285° C. Comparing the peak 51a with the peak 52a, obviously, the thermoluminescent plate obtained by the production method according to the third embodiment has a higher emission intensity than that of the thermoluminescent plate according to the first embodiment.

From the foregoing results it can be confirmed that by the production method according to the third embodiment, a thermoluminescent plate having an emission intensity that is at least equal to or greater than that of a thermoluminescent plate produced by the production method according to the first embodiment described above can be produced.

As described above, by the method of producing the thermoluminescent plate according to the third embodiment, a thermoluminescent plate having an emission intensity which is greater than or equal to that of the thermoluminescent plate according to the first embodiment can be produced more simply and less expensively, i.e., without adding any additional mixture of lithium tetraborate, manganese (IV) oxide and aluminum oxide to the ground material to obtain the second mixture, compared with the production method according to the first embodiment.

(Method of Using Thermoluminescent Layered Product)

A method of using the thermoluminescent layered product described above, i.e., a method of acquiring the three-dimensional dose distribution of radiation using the thermoluminescent layered product will be described below. As an example, a case of using a thermoluminescent layered product produced by layering multiple thermoluminescent plates having a rectangular layer surface will be described below.

The method of acquiring the three-dimensional dose distribution comprises first to third steps. These steps will be described sequentially, starting with the first step.

Figure 9:
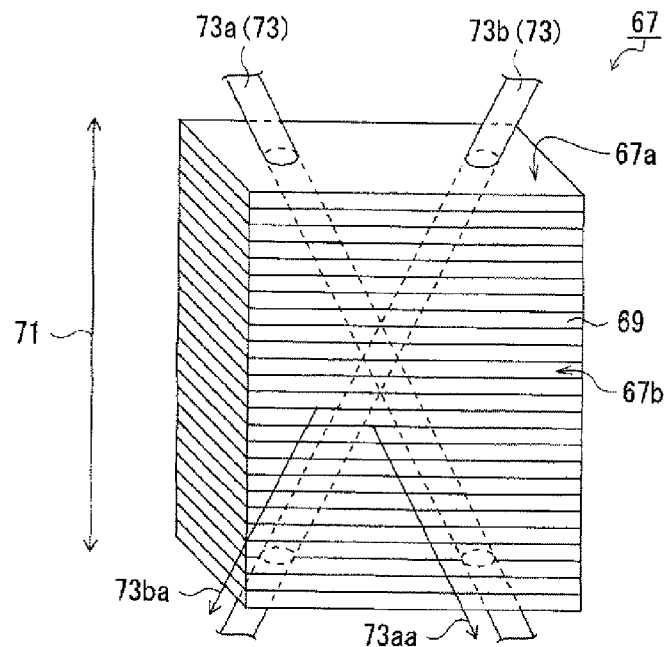
FIG. 9 shows a schematic perspective view depicting a method of acquiring the three-dimensional dose distribution of radiation.
Figure 10:
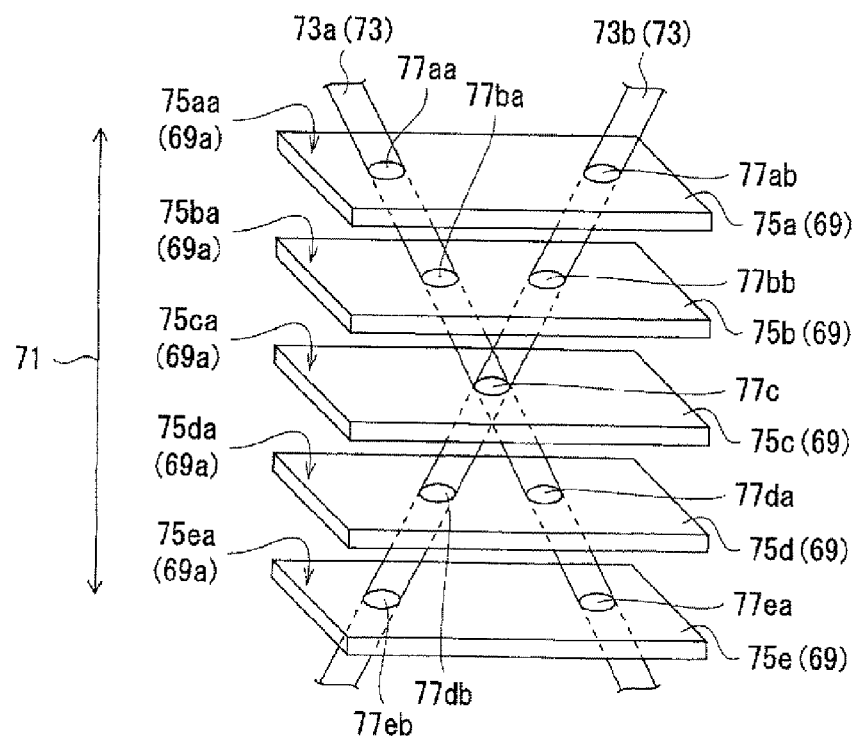
FIG. 10 shows a schematic perspective view depicting a method of acquiring the three-dimensional dose distribution of radiation.
Figure 11:
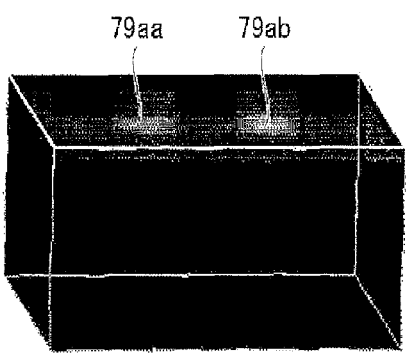
FIGS. 11(A) to 11(E) show images corresponding to the exposure dose distributions which is related to the planar light intensity distributions in the thermoluminescent plates acquired by the method of acquiring the three-dimensional dose distribution of radiation.
Figure 11:
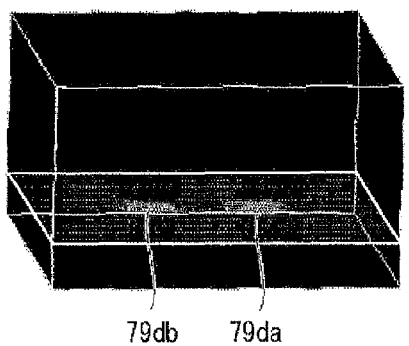
Figure 11:
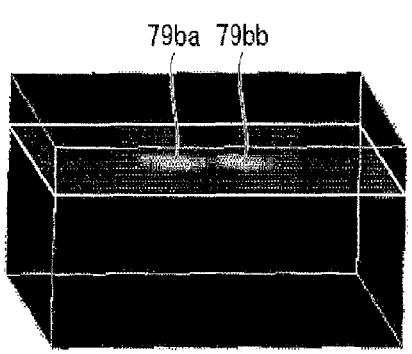
Figure 11:
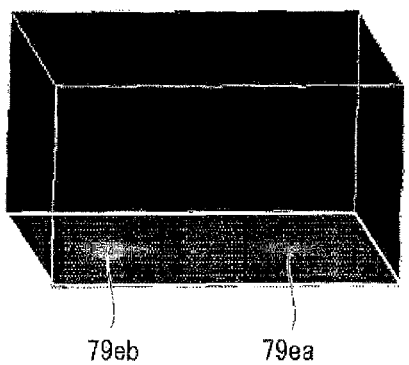
Figure 11:
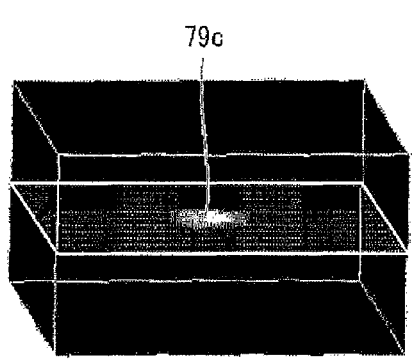
Figure 12:
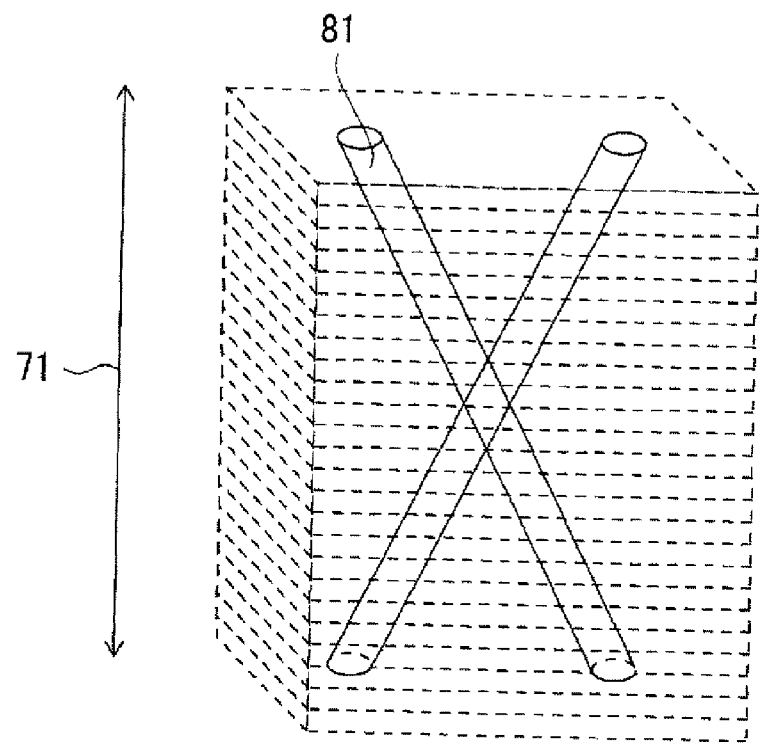
FIG. 12 shows a schematic perspective view depicting a method of acquiring the three-dimensional dose distribution of radiation.

FIGS. 9, 10 and 12 illustrate the method of acquiring the three-dimensional dose distribution, each schematically showing a perspective view of an aspect of each step. FIGS. 11(A) to 11(E) show images of the planar dose distribution of radiation acquired in the second step according to the present embodiment.

In the first step, the thermoluminescent layered product 67 is irradiated with radiation 73 as shown in FIG. 9.

In the first step, the thermoluminescent layered product 67 is irradiated with radiation 73, the dose distribution of which is to be measured, from, for example, an irradiator apparatus used in the radiation therapy described above, whereby the thermoluminescent layered product 67 is exposed.

In the first step, any surface of the thermoluminescent layered product 67, i.e., a main surface perpendicular to the layering direction 71 of the thermoluminescent layered product 67 or a side surface along the layering direction 71, may be irradiated with the radiation 73. FIG. 9 shows a case in which a main surface 67a of the thermoluminescent layered product 67 which is perpendicular to the layering direction 71 is irradiated with radiation 71 emitted from different two directions, i.e., radiations 73a and 73b. In the structural example depicted in FIG. 9, the thermoluminescent layered product 67 is irradiated with the radiations 73a and 73b such that the radiations 73a and 73b cross in the thermoluminescent layered product 67. In this structural example, the radiations 73a and 73b enter via the main surface of the thermoluminescent layered product 67 and propagate in the directions indicated by arrows 73aa and 73ba, respectively.

FIG. 10 shows how the radiation 73a and the radiation 23b emitted travel through the thermoluminescent layered product 67 in the structural example depicted in FIG. 9. FIG. 10 also shows exposed areas in the thermoluminescent plates 69 constituting the thermoluminescent layered product 67. In FIG. 10, the plurality of thermoluminescent plates 69 constituting the thermoluminescent layered product 67 are partially omitted.

As shown in FIG. 10, in the thermoluminescent plates 69 constituting the thermoluminescent layered product 67, areas irradiated with the radiations 73a and 73b are exposed. Specifically, in a thermoluminescent plate 75a constituting the thermoluminescent layered product 67, areas irradiated with the radiations 73a and 73b become exposed areas 77aa and 77ab, respectively. In a thermoluminescent plate 75b, areas irradiated with the radiations 73a and 73b become exposed areas 77ba and 77bb, respectively. In a thermoluminescent plate 75c, an area where the radiations 73a and 73b cross is irradiated with the radiations 73a and 73b and becomes an exposed area 77c. In a thermoluminescent plate 75d, areas irradiated with the radiations 73a and 73b become exposed areas 77da and 77db, respectively. In a thermoluminescent plate 75e, areas irradiated with the radiations 73a and 73b become exposed areas 77ea and 77eb, respectively.

Next, in the second step, an image of thermofluorescence produced by heating from each of the plurality of thermoluminescent plates 69 constituting the thermoluminescent layered product 67 is captured from the direction which is perpendicular to layer surfaces 69a of the multiple thermoluminescent plates 69, and the planar light intensity distribution along the layer surfaces 69a is acquired. This light intensity distribution corresponds to the dose distribution of the radiation 73.

Here, the thermoluminescent layered product 67 which was produced by layering 26 thermoluminescent plates 69 produced by the production method of the first embodiment was used, and an image thereof was captured. To capture the image, the main surface 67a of the thermoluminescent layered product 67 which was perpendicular to the direction 71 was irradiated with 4 MeV of X rays as the radiation from two different directions, as in the structural example depicted in FIG. 9.

The thermoluminescent plates 69 constituting the thermoluminescent layered product 67 are separated, and then each thermoluminescent plate 69 is individually housed in a dark box. At this time, the thermoluminescent plate 69 is housed in the dark box while being placed on a metal plate heated at, for example, 300° C., whereby the thermoluminescent plate 69 is heated rapidly. Consequently, thermofluorescence, i.e., emission of light, occurs in each area irradiated with the radiation 73, i.e., exposed area, in the thermoluminescent plate 69.

Then, in the dark box, an image of the thermoluminescent plate 69 in which the thermofluorescence is occurring is captured with, for example, a CCD camera. At this time, an image of each thermoluminescent plate 69 is captured from the direction that directly faces each layer surface 69a, whereby the light intensity distribution regarding the two-dimensional distribution of the light intensity of the thermofluorescence which occurs in the thermoluminescent plate 69 along the layer surface 69a can be obtained.

To obtain the light intensity distribution obtained by capturing the images as visualized information on the light intensity distribution, the image is processed by a computer using well-known software, imageJ, OpenDX and Photoshop (trade names). Consequently, images shown in FIGS. 11(A) to 11(E) are obtained.

FIGS. 11(A) to 11(E) show images regarding the planar light intensity distribution of thermofluorescence which were captured in the second step.

In the images of the two-dimensional light intensity distributions shown in FIGS. 11(A) to 11(E), a higher radiation dose is shown with a lighter color, and a lower radiation dose is shown with a darker color.

The images shown in FIGS. 11(A) to 11(E) correspond to the thermoluminescent plates 75a, 75b, 75c, 75d and 75e shown in FIG. 10, respectively.

Specifically, when an image of the thermoluminescent plate 75a in the structural example shown in FIG. 10 is captured by the method described above, an image of the dose distribution of exposed areas 77aa and 77ab along a layer surface 75aa is formed as thermoluminescent areas 79aa and 79ab shown in FIG. 11(A).

When an image of the thermoluminescent plate 75b in the structural example shown in FIG. 10 is captured by the method described above, an image of the dose distribution of exposed areas 77ba and 77bb along a layer surface 75ba is formed as thermoluminescent areas 79ba and 79bb shown in FIG. 11(B).

When an image of the thermoluminescent plate 75c in the structural example illustrated in FIG. 10 is captured by the method described above, an image of the dose distribution of an exposed area 77c along a layer surface 75ca is formed as a thermoluminescent area 79c shown in FIG. 11(C). As described above, the exposed area 77c is where the radiations 73a and 73b cross. Hence, the dose in the thermoluminescent area 79e is high. Thus, the image of the two-dimensional light intensity distribution corresponding to the thermoluminescent area 79c exhibits light color.

When an image of the thermoluminescent plate 75d in the structural example illustrated in FIG. 10 is captured by the method described above, an image of the dose distributions of exposed areas 77da and 77db along a layer surface 75da is formed as thermoluminescent areas 79da and 79db shown in FIG. 11(D).

When an image of the thermoluminescent plate 75e in the structural example illustrated in FIG. 10 is captured by the method described above, an image of the dose distributions of exposed areas 77ea and 77eb along a layer surface 75ea is formed as thermoluminescent areas 79ea and 79eb shown in FIG. 11(D).

As described above, in the second step, the above procedure of capturing an image is carried out for every thermoluminescent plate 69 constituting the thermoluminescent layered product 67, whereby an image of the two-dimensional light intensity distribution of thermofluorescence as shown in FIGS. 11(A) to 11(E) is acquired from each of the plurality of thermoluminescent plates 69 constituting the thermoluminescent layered product 67.

Next, in the third step, the light intensity distributions thus acquired are superimposed sequentially in the order of layering in the layering direction 71, whereby an image of stereoscopic light intensity distribution of thermofluorescence shown in FIG. 12, i.e., three-dimensional light intensity distribution, is acquired. Consequently, information on the stereoscopic dose distribution of radiation which corresponds to the stereoscopic light intensity distributions of the thermoluminescent layered product 67 is acquired.

To do so, the images are processed by a computer using, for example, well-known software Visual Fortran and Open DX (trade names), whereby the images of two-dimensional light intensity distributions as shown in FIGS. 11(A) to 11(E) are superimposed sequentially in the order of layering of the thermoluminescent layered product 67 shown in FIG. 9.

As a result, in the images obtained in the second step, planar thermoluminescent areas corresponding to the exposed areas of the thermoluminescent plates 69 along the layer surfaces 69a are layered three-dimensionally. Consequently, from the images of thermoluminescent areas thus layered, stereoscopic thermoluminescent areas 81 are obtained which corresponds to stereoscopic exposed areas of the thermoluminescent layered product 67, and the thermoluminescent area 81 can substantially be considered as the three-dimensional dose distribution of radiation emitted.

As described above, by use of the thermoluminescent layered product 67 described above, an image of the three-dimensional dose distribution of radiation can easily be acquired.

In the present embodiment, the method of acquiring an image of the three-dimensional dose distribution of radiation using the thermoluminescent layered product 67 comprising the thermoluminescent plates produced by the production method according to the first embodiment is described as an example. However, even when a well-known, conventional thermoluminescent plate is used, the three-dimensional dose distribution of radiation can be acquired by performing the first to third steps described above.

Further, in the present embodiment, the structural example in which radiation enters via the main surface 67a which is perpendicular to the layering direction 71 of the thermoluminescent layered product 67 to acquire information on the three-dimensional dose distribution of the radiation is described as an example. However, as already described, in the present embodiment, radiation may enter via a side surface along the layering direction 71 of the thermoluminescent layered product 67 to acquire the three-dimensional dose distribution of the radiation.

Figure 13:
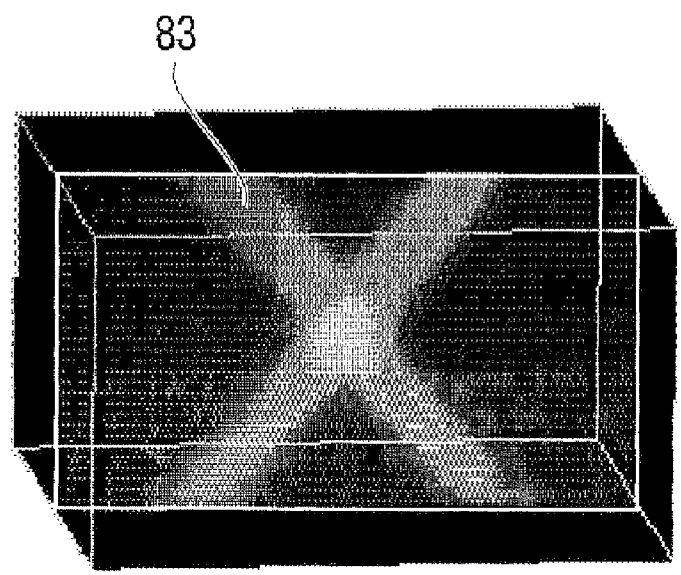
FIG. 13 shows another example of an image corresponding to the exposure dose distribution which is related to the planar light intensity distribution of thermofluorescence.

For example, in the case in which a side surface 67b of the thermoluminescent layered product 67 along the layering direction 71 of the thermoluminescent layered product 67 is irradiated with radiations emitted from two different directions along a flat surface which is parallel to the layer surface 69a in the structural example illustrated in FIG. 9, an image of the two-dimensional light intensity distribution showing a thermoluminescent area 83 along the layer surface 69a, as shown in, for example, FIG. 13 can be obtained from the exposed thermoluminescent plate in the second step described above. Even in this case, by obtaining the images of the two-dimensional light intensity distributions of the thermoluminescent plates 69 which constitute the thermoluminescent layered product 67 along the layer surfaces 69a and then superimposing the images in the third step described above, information on the three-dimensional dose distribution of radiation can be obtained from the light intensity distribution, as in the present embodiment.

REFERENCE SIGNS LIST

11, 67: Thermoluminescent layered product
13, 69, 75a, 75b, 75c, 75d, 75e: Thermoluminescent plate
15, 71: Layering direction
73, 73a, 73b: Radiation
77aa, 77ab, 77ba, 77bb, 77c, 77da, 77db, 77ea, 77eb: Exposed area
79aa, 79ab, 79ba, 79bb, 79c, 79da, 79db, 79ea, 79eb, 83: Thermoluminescent area
81: Thermoluminescent area

The invention claimed is:

1. A method of producing a thermoluminescent plate, comprising:
    mixing lithium tetraborate, manganese (IV) oxide and aluminum oxide together to obtain a first mixture;
    subjecting the first mixture to thermal treatment to form a first sintered material;
    grinding the first sintered material to form a ground material;
    mixing the ground material with activated carbon to obtain a second mixture;
    compression molding the second mixture into the shape of a flat plate to produce a plate; and
    subjecting the plate to thermal treatment to produce a thermoluminescent plate as a second sintered material,
    thereby producing a thermoluminescent plate having a density of $1\pm0.10$ g/cm$^{-3}$.

2. The method of claim 1, wherein in obtaining the first mixture, the manganese (IV) oxide is added at a ratio of 0.03 to 0.16 wt % with respect to the lithium tetraborate, and the aluminum oxide is added at a ratio of 0.6 to 3.6 wt % with respect to the lithium tetraborate.

3. The method of claim 2, wherein in obtaining the first mixture, 0.037 wt % of manganese (IV) oxide and 0.72 wt % of aluminum oxide with respect to the lithium tetraborate are added.

4. The method of claim 1, wherein in obtaining the second mixture, the activated carbon is mixed at a weight ratio of up to 0.19 with respect to the ground material.

5. The method of claim 4, wherein in obtaining the second mixture, the ground material and the activated carbon are mixed at a weight ratio of 1:0.16.

6. The method of claim 1, wherein in obtaining the second mixture, no additional mixture of lithium tetraborate, manganese (IV) oxide and aluminum oxide is mixed with the ground material.

7. The method of claim 1, further comprising obtaining a third mixture by mixing lithium tetraborate, manganese (IV) oxide and aluminum oxide, wherein in obtaining the second mixture, the third mixture is mixed into the ground material and the activated carbon.

8. The method of claim 7, wherein:
    in obtaining the first mixture, the manganese (IV) oxide is added at a ratio of 0.01 to 0.20 wt % with respect to the lithium tetraborate, and the aluminum oxide is added at a ratio of 0.02 to 2.00 wt % with respect to the lithium tetraborate; and
    in obtaining the third mixture, the manganese (IV) oxide is added at a ratio of 0.01 to 0.20 wt % with respect to the lithium tetraborate, and the aluminum oxide is added at a ratio of 0.02 to 2.00 wt % with respect to the lithium tetraborate.

9. The method of claim 7, wherein in obtaining the second mixture, the ground material, the third mixture and the activated carbon are mixed at a weight ratio of 1.00:0.10:0.18.

10. The method of claim 7, wherein in obtaining the third mixture, boron oxide is additionally mixed.

11. The method of claim 10, wherein in obtaining the third mixture, the manganese (IV) oxide is added at a ratio of 0.01 to 0.20 wt % with respect to the lithium tetraborate, the aluminum oxide is added at a ratio of 0.02 to 2.00 wt % with respect to the lithium tetraborate, and the boron oxide is added at a ratio which is up to 8.00 wt % with respect to the lithium tetraborate.

12. A method of producing a thermoluminescent layered product: comprising:
    a first step of preparing a plurality of thermoluminescent plates produced by the method in accordance with claim 1; and
    a second step of layering the plurality of thermoluminescent plates to produce a thermoluminescent layered product.

13. A thermoluminescent plate having a density of $1\pm0.10$ g/cm$^{-3}$ produced by the method in accordance with claim 1.

14. A thermoluminescent layered product wherein a plurality of thermoluminescent plates of claim 13 are layered.

15. The thermoluminescent layered product of claim 14 for obtaining a three-dimensional dose distribution of radiation.

16. A method of obtaining a three-dimensional dose distribution of radiation, comprising:
    irradiating the thermoluminescent layered product of claim 14 with radiation;
    capturing, from a direction perpendicular to a layer surface of the plurality of thermoluminescent plates, an image of thermofluorescence which occurs by heating from each of the plurality of thermoluminescent plates of the thermoluminescent layered product to acquire planar light intensity distributions of the radiation along the layer surface, said planar light intensity distributions corresponding to the dose distribution of the radiation; and
    superimposing the light intensity distributions sequentially in an order of layering in a direction of layering to acquire a stereoscopic dose distribution of the radiation which corresponds to a stereoscopic light intensity distribution in the thermoluminescent layered product.

17. The thermoluminescent plate of claim 13 has an effective atomic number of the plate is 7.3 to 7.5.

18. The method of claim 1, wherein the effective atomic number of the plate is 7.3 to 7.5.

19. A method of producing a thermoluminescent plate, comprising:
    mixing lithium tetraborate and manganese (IV) oxide together to obtain a first mixture;
    subjecting the first mixture to thermal treatment to form a first sintered material;
    grinding the first sintered material to produce a ground material;
    mixing lithium tetraborate, manganese (IV) oxide and aluminum oxide together to obtain a third mixture;
    mixing the ground material and the third mixture with activated carbon to obtain a second mixture;
    compression molding the second mixture into the shape of a flat plate to form a plate; and subjecting the plate to thermal treatment to produce a thermoluminescent plate as a second sintered material, thereby producing a thermoluminescent plate having a density of $1\pm0.10$ g/cm$^{-3}$.

20. The method of claim 19, wherein in obtaining the third mixture, boron oxide is additionally mixed.

21. The method of claim 19, wherein the effective atomic number of the plate is 7.3 to 7.5.

* * * * *